US010903920B2

(12) United States Patent
Azarian Yazdi et al.

(10) Patent No.: US 10,903,920 B2
(45) Date of Patent: Jan. 26, 2021

(54) INTERFERENCE MANAGEMENT BASED ON REFERENCE SIGNALS IN WIRELESS COMMUNICATIONS

(71) Applicant: QUALCOMM Incorporated, San Diego, CA (US)

(72) Inventors: Kambiz Azarian Yazdi, San Diego, CA (US); Haitong Sun, Cupertino, CA (US); Peter Pui Lok Ang, San Diego, CA (US); Jay Kumar Sundararajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/956,978

(22) Filed: Apr. 19, 2018

(65) Prior Publication Data
US 2018/0323887 A1 Nov. 8, 2018

Related U.S. Application Data

(60) Provisional application No. 62/502,488, filed on May 5, 2017.

(51) Int. Cl.
H04B 17/345 (2015.01)
H04W 72/04 (2009.01)
(Continued)

(52) U.S. Cl.
CPC ......... *H04B 17/345* (2015.01); *H04L 5/0007* (2013.01); *H04L 5/0048* (2013.01); *H04L 5/0073* (2013.01); *H04W 24/08* (2013.01); *H04W 72/0446* (2013.01); *H04W 72/1231* (2013.01)

(58) Field of Classification Search
None
See application file for complete search history.

(56) References Cited

U.S. PATENT DOCUMENTS

2002/0015393 A1* 2/2002 Pan ...................... H04B 7/2618
370/335
2013/0051374 A1* 2/2013 Faurie ............... H04W 72/0446
370/337
(Continued)

OTHER PUBLICATIONS

Intel Corp. (3GPP TSG RAN1 WG Meeting #87, Subframe structure for NR dynamic TDD, dated Nov. 2016, all pages) (Year: 2016).*
(Continued)

*Primary Examiner* — Gregory B Sefcheck
*Assistant Examiner* — Srinivasa R Reddivalam
(74) *Attorney, Agent, or Firm* — Arent Fox LLP

(57) ABSTRACT

Aspects described herein relate to measuring cross-link interference in wireless communications. A portion of a slot that includes a downlink reference signal transmitted by a base station and an uplink reference signal transmitted by a user equipment (UE) can be determined, where the uplink reference signal and the downlink reference signal at least partially overlap within the portion of the slot. The downlink reference signal can be received from the base station and the uplink reference signal can be received from the UE in the portion of the slot. Cross-link interference between the downlink reference signal and the uplink reference signal can be measured.

30 Claims, 14 Drawing Sheets

(51) Int. Cl.
*H04L 5/00* (2006.01)
*H04W 24/08* (2009.01)
*H04W 72/12* (2009.01)

(56) References Cited

U.S. PATENT DOCUMENTS

2015/0229461 A1* 8/2015 DiFazio ............... H04L 5/14
370/280
2015/0327257 A1* 11/2015 Zhang ............ H04W 72/0413
370/280
2017/0188357 A1* 6/2017 Visotsky ............ H04L 5/1469

OTHER PUBLICATIONS

Intel Corporation: "Evaluation Results on Dynamic TDD in Dense Urban Scenario at 4GHz," 3GPP Draft; R1-1703446 Evaluation Results on Dynamic TDD for Dense Urban Scenario at 4GHZ, 3rd Generation Partnership Project (3GPP), Mobile Competence Centre; 650, Route Des Lucioles; F-06921 Sophi, vol. RAN WG1, no. Athens, Greece; Feb. 13, 2017-Feb. 17, 2017, Feb. 12, 2017, XP051210568, 7 pages, Retrieved from the Internet: URL: http://www.3gpp.org/ftp/Meetings_3GPP_SYNC/RAN1/Docs/ [retrieved on Feb. 12, 2017].
Intel Corporation: "On Cross-Link Interference Measurement for NR Dynamic TDD," 3GPP Draft; R1-1704775 on Cross Link Interference Measurement for NR TDD, 3rd Generation Partnership Project (3GPP), Mobile Competence Centre; 650, Route Des Lucioles; F-06921 Sophia-Antipolis Cedex, vol. RAN WG1, no. Spokane, WA, USA; Apr. 3, 2017-Apr. 7, 2017, Apr. 2, 2017, XP051242912, 5 pages, Retrieved from the Internet: URL: http://www.3gpp.org/ftp/Meetings_3GPP_SYNC/RAN1/Docs/ [retrieved on Apr. 2, 2017].
International Search Report and Written Opinion—PCT/US2018/028625—ISA/EPO—dated Jul. 17, 2018.

* cited by examiner

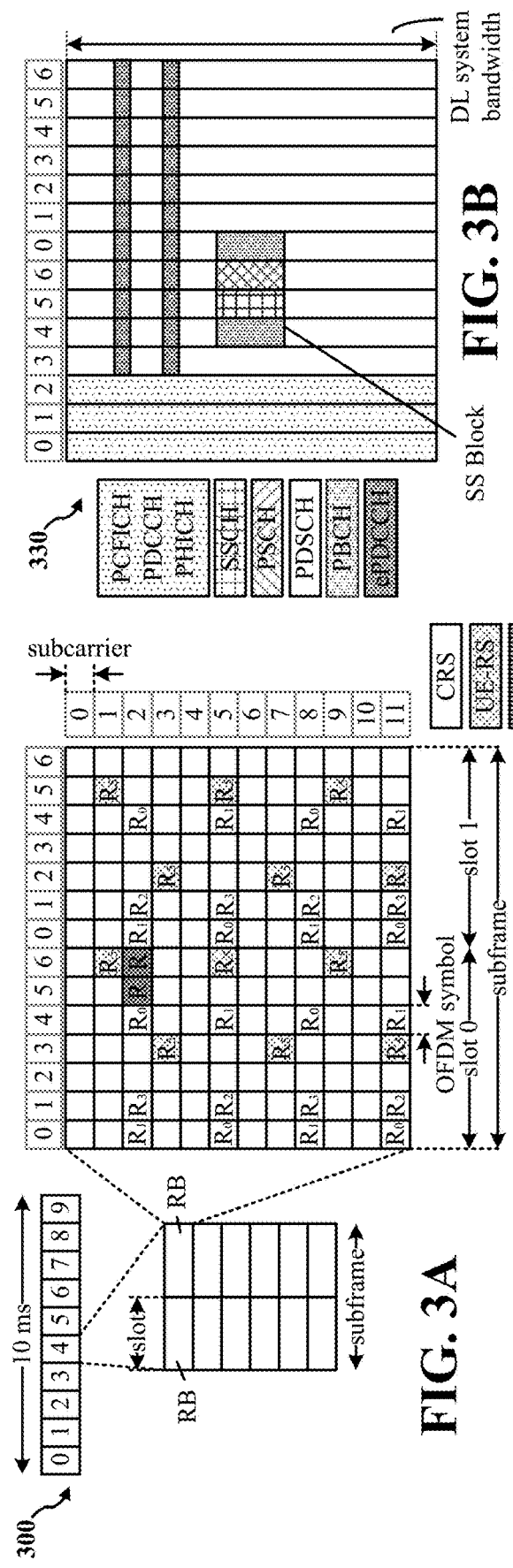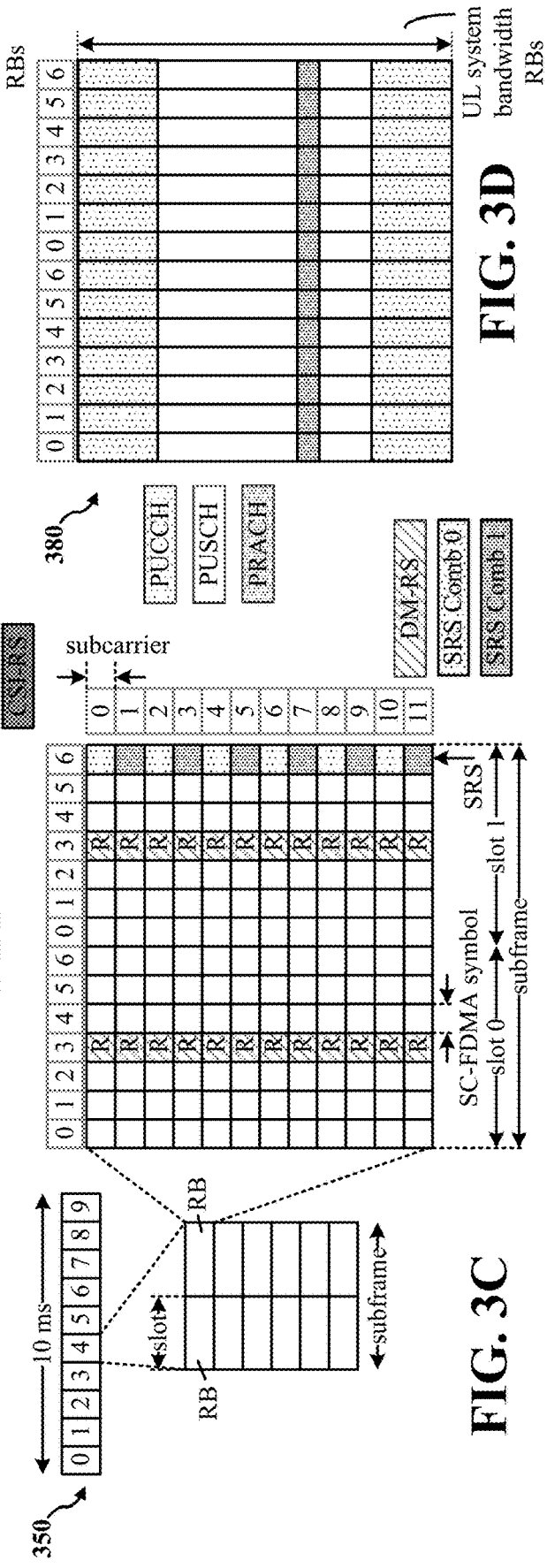
FIG. 3A  FIG. 3B  FIG. 3C  FIG. 3D

INTERFERENCE MANAGEMENT BASED ON REFERENCE SIGNALS IN WIRELESS COMMUNICATIONS

CLAIM OF PRIORITY UNDER 35 U.S.C. § 119

The present application for patent claims priority to Provisional Application No. 62/502,488, entitled "INTERFERENCE MANAGEMENT BASED ON CHANNEL STATE INFORMATION-REFERENCE SIGNAL" filed May 5, 2017, which is assigned to the assignee hereof and hereby expressly incorporated by reference herein for all purposes.

BACKGROUND

Aspects of the present disclosure relate generally to wireless communication networks, and more particularly, to interference management in wireless communication networks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, in dynamic TDD networks, base stations (BSs) and user equipment (UEs) may transmit/receive on the same frequency in a default direction (e.g., downlink or uplink) and a BS may be allowed to switch the direction within a division of time (e.g., a slot) and/or otherwise when another BS maintains the default direction. If a first BS and/or UE changes the direction while a second BS and/or UE does not, cross-link interference may be experienced between the first BS and/or UE and the second BS and/or UE.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A method for measuring cross-link interference in wireless communications is provided. The method includes determining a portion of a slot that includes a downlink reference signal transmitted by a base station and an uplink reference signal transmitted by a user equipment (UE), where the uplink reference signal and the downlink reference signal at least partially overlap within the portion of the slot, receiving, in the portion of the slot, the downlink reference signal from the base station, receiving, in the portion of the slot, the uplink reference signal from the UE, and measuring, based on determining the portion of the slot, cross-link interference between the downlink reference signal and the uplink reference signal.

In another example, an apparatus for measuring cross-link interference in wireless communications is provided that includes a transceiver for communicating one or more wireless signals via at least the transmitter and one or more antennas, a memory configured to store instructions, and one or more processors communicatively coupled with the transceiver and the memory. The one or more processors are configured to determine a portion of a slot that includes a downlink reference signal transmitted by a base station and an uplink reference signal transmitted by a UE, where the uplink reference signal and the downlink reference signal at least partially overlap within the portion of the slot, receive, in the portion of the slot, the downlink reference signal from the base station, receive, in the portion of the slot, the uplink reference signal from the UE, and measure, based on determining the portion of the slot, cross-link interference between the downlink reference signal and the uplink reference signal.

In another example, an apparatus for measuring cross-link interference in wireless communications is provided. The apparatus includes means for determining a portion of a slot that includes a downlink reference signal transmitted by a base station and an uplink reference signal transmitted by a UE, where the uplink reference signal and the downlink reference signal at least partially overlap within the portion of the slot, means for receiving, in the portion of the slot, the downlink reference signal from the base station, means for receiving, in the portion of the slot, the uplink reference signal from the UE, and means for measuring, based on determining the portion of the slot, cross-link interference between the downlink reference signal and the uplink reference signal.

Still, in another example, a computer-readable medium, including code executable by one or more processors for measuring cross-link interference in wireless communications, is provided. The code includes code for determining a portion of a slot that includes a downlink reference signal transmitted by a base station and an uplink reference signal transmitted by a UE, where the uplink reference signal and the downlink reference signal at least partially overlap within the portion of the slot, code for receiving, in the portion of the slot, the downlink reference signal from the base station, code for receiving, in the portion of the slot, the uplink reference signal from the UE, and code for measuring, based on determining the portion of the slot, cross-link interference between the downlink reference signal and the uplink reference signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3A is a diagram illustrating an example of a downlink (DL) frame structure.

FIG. 3B is a diagram illustrating an example of channels within the DL frame structure.

FIG. 3C is a diagram illustrating an example of an uplink (UL) frame structure.

FIG. 3D is a diagram illustrating an example of channels within the UL frame structure.

DETAILED DESCRIPTION

Figure 1:
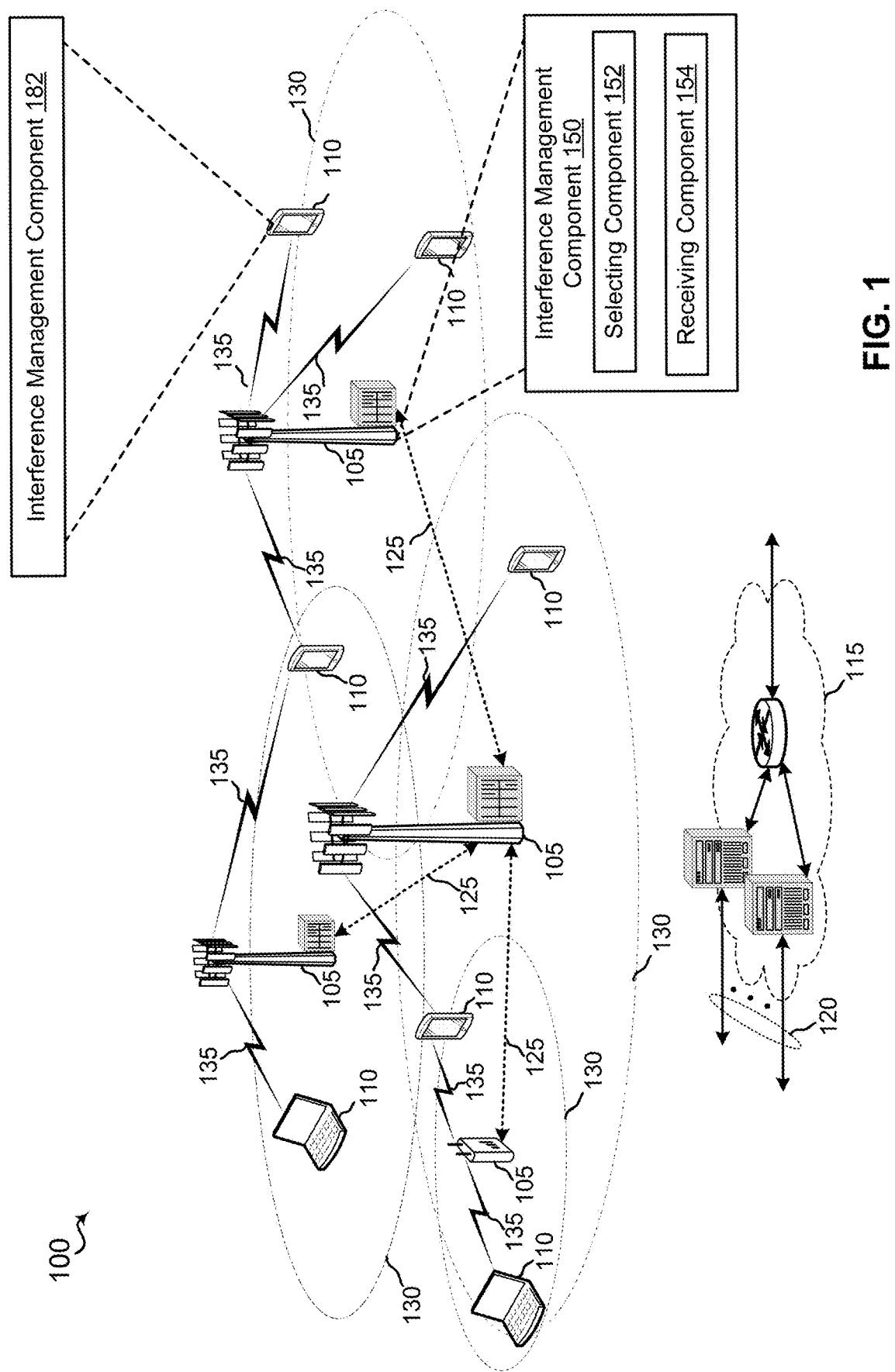
FIG. 1 is a schematic diagram of a wireless communication network including at least one base station having an interference management component and at least one UE for managing interference according to this disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, terms "function" or "component" as used herein may be one of the parts that make up a system, may be hardware, firmware, and/or software stored on a computer-readable medium, and may be divided into other functions/components.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Aspects described herein relate to interference management based on reference signals in wireless communications. For example, a base station and user equipment (UE) in wireless communications with one another may communicate in one direction (e.g., downlink or uplink) in a given instant of time. Where a first base station and UE are communicating in one direction while a second neighboring base station and UE are communicating in the opposite direction, this may cause cross-link interference. For example, where the first base station is transmitting downlink communication to the first UE, the cross-link interference may include uplink transmissions from the second UE (intended for the second base station). Similarly, where the first base station is receiving uplink communication from the first UE, the cross-link interference may include downlink transmissions from the second base station (intended for the second UE). Aspects are described for scheduling reference signals to allow devices (e.g., base stations and/or UEs) to receive the reference signals and measure/mitigate cross-link interference.

In an example, a base station that transmits downlink communications to a UE in a slot, and is going to switch to uplink communications in the slot or a next slot, can schedule an uplink reference signal transmission from the UE to allow neighboring UEs receiving downlink transmissions from other base stations to receive the uplink reference signal for measuring cross-link interference from the UE. In an example, the base station can schedule the uplink reference signal in a similar portion of the slot that is scheduled for a downlink reference signal from one or more base stations (e.g., the other base stations serving the neighboring UEs). This allows the neighboring UEs to receive the downlink and uplink reference signals, and accordingly measure the cross-link interference that is (and/or will be) caused by the UE to downlink communications to the neighboring UEs. Similarly, the base station can receive the uplink reference signal from the UE and downlink reference signals from the one or more base stations (e.g., the other base station serving the neighboring UEs) and accordingly measure cross-link interference that is (and/or will be) caused by the other base stations to uplink communications by the UE.

For example, the base station can schedule the uplink reference signal transmission at one or more portions of a downlink centric slot, such as in one or more symbols. In one example, the base station can schedule the uplink reference signal transmission in a last symbol used for downlink communications in the slot. In another example, the base station can schedule one or more guard symbols adjacent to the one or more symbols scheduled for uplink reference signal transmission, which can allow for improved alignment of the uplink reference signal with the downlink reference signals transmitted by the other base stations. Moreover, in an example, the base station can schedule the uplink reference signal transmission according to a selected slot pattern for converting to additional uplink communications. In this example, the selected slot pattern may have a specified slot for transmitting the uplink reference signal.

In additional examples described herein, similar functionality can be used to schedule a downlink reference signal to be transmitted in an uplink centric slot to facilitate switching directions from uplink to downlink within the slot (or in a next slot). In this example, the base station can transmit the downlink reference signal in a portion of the slot during which neighboring UEs transmit uplink reference signals to the one or more other base stations. This allows the UE communicating with the base station transmitting the downlink reference signal to measure cross-link interference that is (and/or will be) caused by the neighboring UEs and allows the one or more other base stations to determine cross-link interference that is (and/or will be) caused by the base station transmitting the downlink reference signal. In the examples described above, the reference signals may include channel state information reference signals (CSI-RS) and/or similar reference signals.

Referring to FIG. 1, in accordance with various aspects of the present disclosure, an example wireless communication network 100 includes at least one base station 105 that can include an interference management component 150 for managing interference in wireless communications. For example, base station 105 and/or interference management component 150 may include a selecting component 152 to select a slot and/or a portion of a slot for configuring a UE (e.g., UE 110) to transmit an uplink reference signal, a slot and/or a portion of a slot for transmitting a downlink reference signal, etc., and/or a receiving component 154 to receive, from the (e.g., UE 110), the uplink reference signal, where the uplink reference signal can overlap one or more downlink reference signals from one or more other base stations. The example wireless communication network 100 also includes at least one UE 110 that can include an interference management component 180 for similarly managing interference in wireless communications, as described herein.

Additional features of the present aspects are described in more detail with respect to FIGS. 2-14.

The wireless communication network 100 may include one or more base stations, eNBs, or gNBs 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell.

The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary and/or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs 110. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bi-directional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or a listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
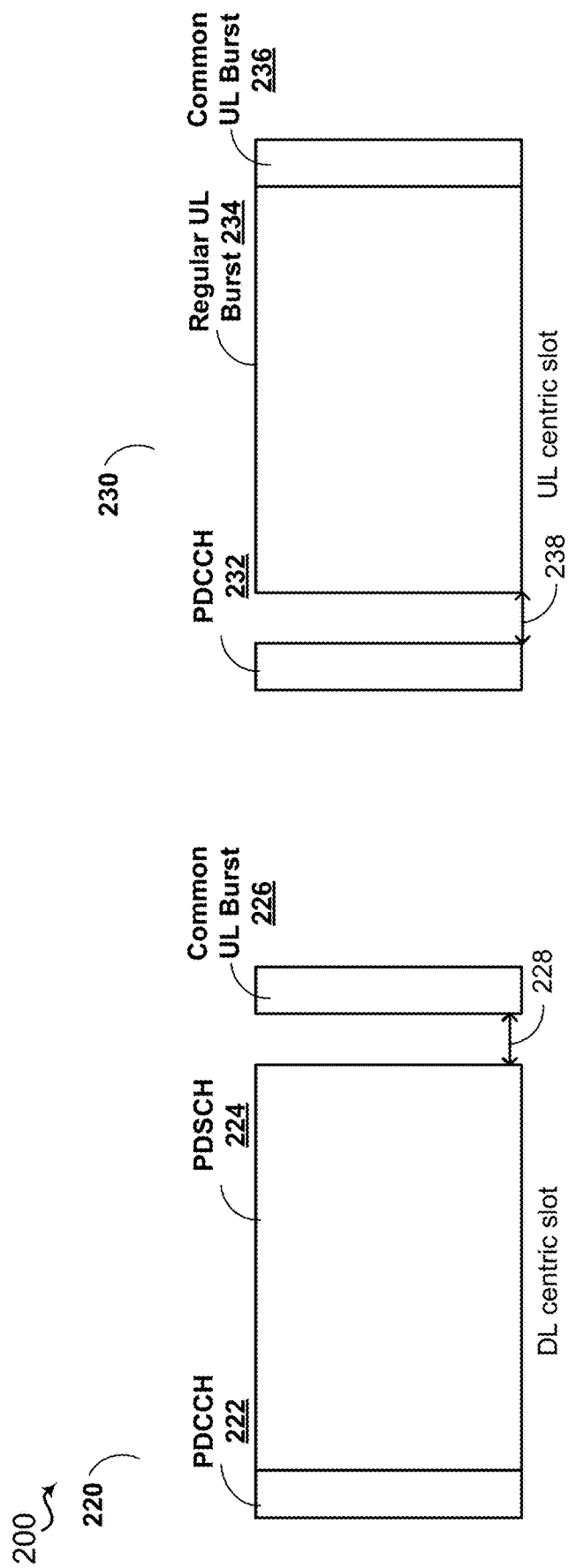
FIG. 2 illustrates an example slot (or frame) structure including a downlink centric slot and/or an uplink centric slot.

FIG. 2 illustrates an example slot (or frame) structure 200 including a downlink centric slot (220) and/or an uplink centric slot (230). As illustrated in FIG. 2, a downlink centric slot 220 may include a physical downlink control channel (PDCCH) 222, a physical downlink shared channel (PDSCH) 224, and/or a common uplink burst 226; and an uplink centric slot 230 may include a PDCCH 232, a regular uplink burst 234 (e.g., which may include resources for transmitting one or more physical uplink shared channels (PUSCHs)), and/or a common uplink burst 236. In an aspect, a guard interval 228 may separate PDSCH 224 and common uplink burst 226 and/or a guard interval 238 may separate PDCCH 232 and PUSCH 234 to minimize interference. The common uplink burst(s) 228 and/or 236 may include one or more physical uplink control channels (PUCCHs), one or more PUSCHs, etc. Moreover, for example, the slot structures 220, 230 may include a collection of frequency resources over symbols (e.g., OFDM symbols, SC-FDM symbols, etc.) or other time intervals. For example, each of the PDCCH 222, PDSCH 224, common UL burst 226, guard interval 228, PDCCH 232, regular UL burst 234, common UL burst 236 and/or guard interval 238 may include one or more symbols in the slot. In addition, for example, a base station (e.g., base station 105 in FIG. 1) can configure (or schedule) one or more UEs (e.g., a UE 110 in FIG. 1) to communicate with the base station using resources defined according to such a downlink centric slot 220 or uplink centric slot 230.

FIG. 3A is a diagram 300 illustrating an example of a DL frame structure. FIG. 3B is a diagram 330 illustrating an example of channels within the DL frame structure. FIG. 3C is a diagram 350 illustrating an example of an UL frame structure. FIG. 3D is a diagram 380 illustrating an example of channels within the UL frame structure. Other wireless communication technologies may have a different frame structure and/or different channels.

A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme. In some wireless technologies, such as 5G for example, a frame may include (or may be referred to as) one slot having a number of symbols (e.g., 12 or 14).

As illustrated in FIG. 3A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 3A illustrates CRS for antenna ports 0, 1, 2, and 3 (indicated as R0, R1, R2, and R3, respectively), UE-RS for antenna port 5 (indicated as R5), and CSI-RS for antenna port 15 (indicated as R).

FIG. 3B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 3B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 3B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 4:
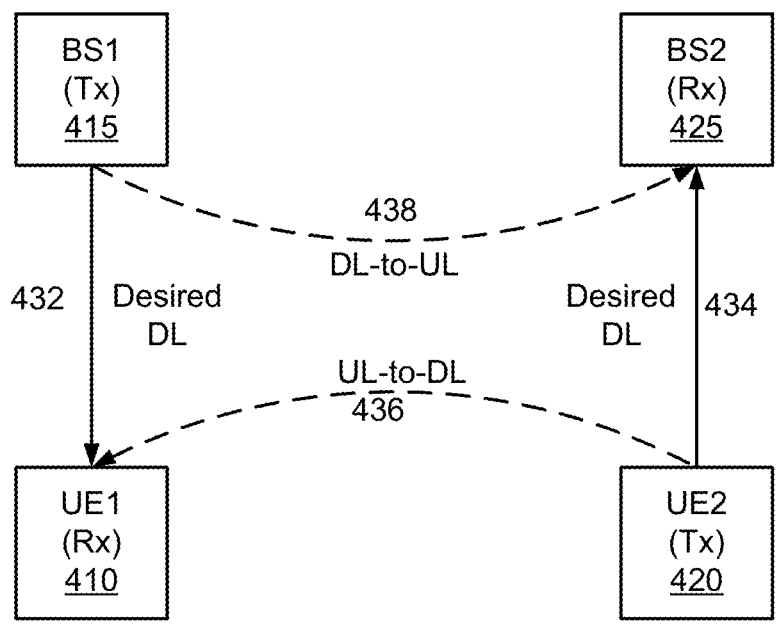
FIG. 4 illustrates an example of a wireless communications network with cross-link or mixed interference.

FIG. 4 illustrates an example wireless communications network 400 with possible cross-link or mixed interference experienced by nodes of the network 400.

As illustrated in FIG. 4, a base station1 (415), e.g., BS1 (415), may be transmitting on a downlink 432 (e.g., using resources scheduled for downlink communications) to a UE1 (410) during a downlink centric slot (e.g., slot 220 of FIG. 2). BS1 (415) and UE1 (410) may be same or similar to base station 105 and/or UE 110 of FIG. 1, respectively. During the same downlink centric slot, a BS2 (425) may switch transmission direction, and allow a UE2 (420) to transmit on an uplink 434 (e.g., using resources scheduled for downlink communications) to BS2 (425). BS2 (425) and UE2 (420) may be same or similar to base station 105 and/or UE 110 of FIG. 1, respectively. Although, FIG. 4 is described with BS1 (415) transmitting on downlink 432 and BS2 (425) receiving on uplink (434), both BS1 (415) and BS2 (425) may be transmitting in a same direction (e.g., downlink direction) downlinks in an immediately preceding downlink centric slot or portion of the slot during which the BS2 425 switches transmission direction.

In such a scenario, when BS2 (425) converts the time slot to an uplink centric slot, BS-to-BS and/or UE-to-UE interferences as shown by 438 and/or 436 may be introduced. For example, BS1 (415) may introduce a DL-to-UL interference 438 at BS2 (425), which is also receiving uplink communications from UE2 420, and/or UE2 (420) may introduce UL-to-DL interference 436 at UE1 (410), which is also receiving communications from BS1 415. That is, interference 438 may interfere with uplink communications between UE2 (420) and BS2 (425) on link 434 and/or interference 436 may interference with DL communications between UE1 (410) and BS1 (415) on link 432. Such interference may be referred to as mixed or cross-link interference. In one example, BS1 (415) and BS2 (425) may have line of sight (LOS). In another example, UE1 (410) and UE2 (420) may be in close vicinity with each other. Either or both of these conditions may cause potentially excessive cross-link interference.

The cross-link or mixed interference described above may be managed, for example, by identifying pairs of BSs and/or UEs with excessive interference, which may, for example, be determined by jamming graphs or request to send (RTS)/clear to send (CTS) messages. For example, a jamming graph can be generated based on reference signals periodically transmitted by a node (e.g., a UE or a BS) (e.g., every few seconds) and/or and measuring of the reference signals by other nodes. The jamming graph can then be used to assist in determining nodes that are close to each other. A RTS/CTS mechanism may be used by a BS that is planning to convert, e.g., from transmitting to receiving such as BS2 (425), by sending a RTS message and receiving a CTS message from a UE (e.g., UE2 (420)). Thus, the UE is aware that the BS is going to transmit, and can avoid also transmitting uplink communications that may otherwise cause cross-link interference. The cross-link or mixed interference profiled determined by the jamming graphs and or RTS/CTS message may be used to suppress interference and/or coordinate transmission or scheduling.

Aspects described herein provide additional techniques for managing cross-interference in a seamless and efficient manner.

Figure 5:
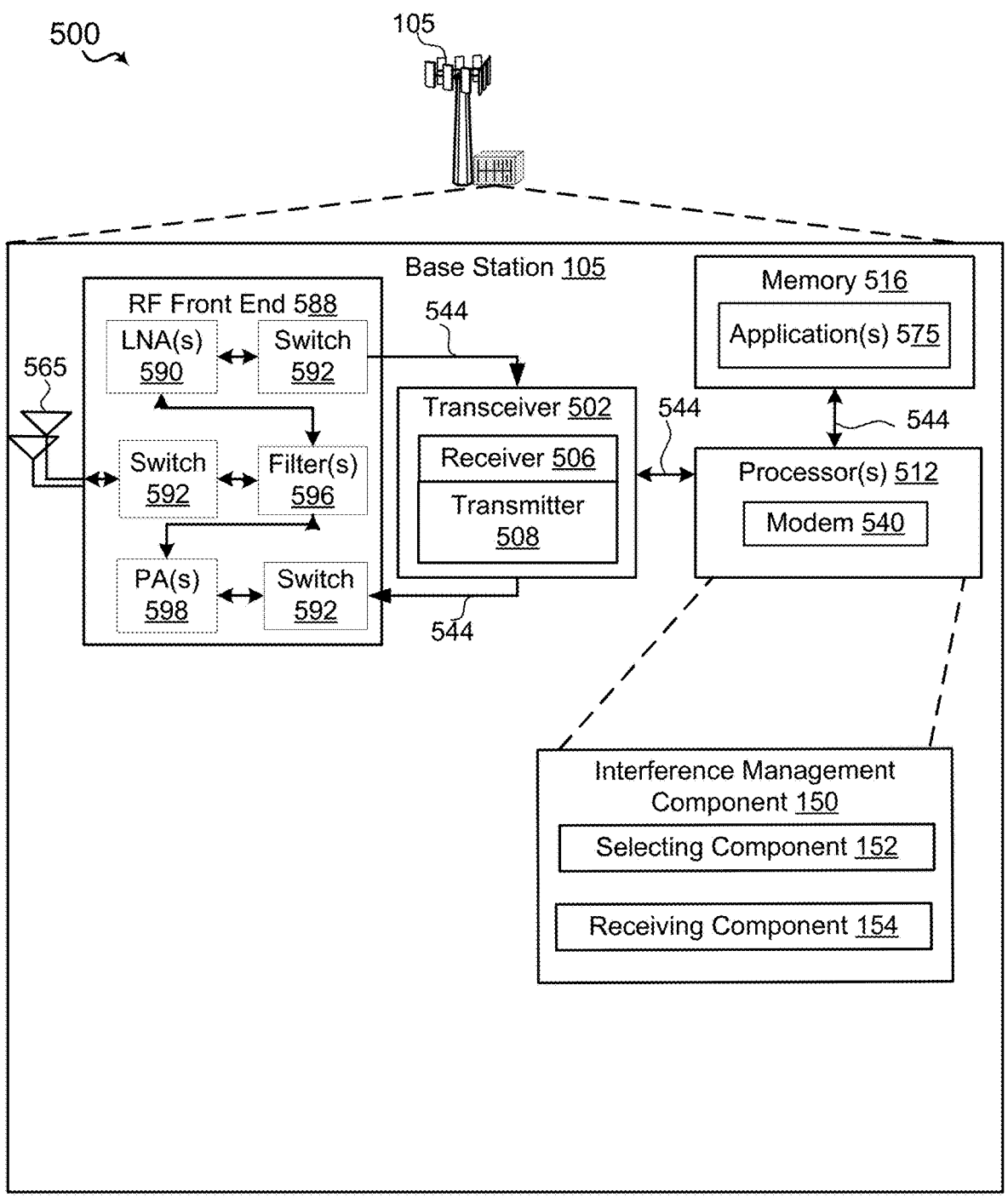
FIG. 5 is a schematic diagram of example components of a base station of FIG. 1.

Referring to FIG. 5, one example of an implementation of base station 105 may include a variety of components, some of which have already been described above, but including components such as one or more processors 512 and memory 516 and transceiver 502 in communication via one or more buses 544, which may operate in conjunction with modem 540. Further, the one or more processors 512, modem 540, memory 516, transceiver 502, RF front end 588 and one or more antennas 565, may be configured to support voice and/or data calls (simultaneously or non-simultaneously) in one or more radio access technologies.

In an aspect, the one or more processors 512 can include a modem 540 that can use one or more modem processors. The various components related to managing interference may be included in modem 540 and/or processors 512 and, in an aspect, can be executed by a single processor, while in other aspects, different ones of the components may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with transceiver 502. In other aspects, some of the features of the one or more processors 512 and/or modem 540 associated with managing interference may be performed by transceiver 502.

Also, memory 516 may be configured to store data used herein and/or local versions of applications 575 being executed by at least one processor 512. Memory 516 can include any type of computer-readable medium usable by a computer or at least one processor 512, such as random access memory (RAM), read only memory (ROM), tapes, magnetic discs, optical discs, volatile memory, non-volatile memory, and any combination thereof. In an aspect, for example, memory 516 may be a non-transitory computer-readable storage medium that stores one or more computer-executable codes, and/or data associated therewith, when base station 105 is operating at least one processor 512 to execute interference management component 150, selecting component 152, and/or receiving component 154.

Transceiver 502 may include at least one receiver 506 and at least one transmitter 508. Receiver 506 may include hardware, firmware, and/or software code executable by a processor for receiving data, the code comprising instructions and being stored in a memory (e.g., computer-readable medium). Receiver 506 may be, for example, a radio frequency (RF) receiver. In an aspect, receiver 506 may receive signals transmitted by at least one UE 110. Additionally, receiver 506 may process such received signals, and also may obtain measurements of the signals, such as, but not limited to, Ec/Io, SNR, RSRP, RSSI, etc. Transmitter 508 may include hardware, firmware, and/or software code executable by a processor for transmitting data, the code comprising instructions and being stored in a memory (e.g., computer-readable medium). A suitable example of transmitter 508 may including, but is not limited to, an RF transmitter.

Moreover, in an aspect, base station 105 may include RF front end 588, which may operate in communication with one or more antennas 565 and transceiver 502 for receiving and transmitting radio transmissions, for example, wireless communications transmitted by UE 110 (e.g., and/or by another base station). RF front end 588 may be connected to one or more antennas 565 and can include one or more low-noise amplifiers (LNAs) 590, one or more switches 592, one or more power amplifiers (PAs) 598, and one or more filters 596 for transmitting and receiving RF signals.

In an aspect, LNA 590 can amplify a received signal at a desired output level. In an aspect, each LNA 590 may have a specified minimum and maximum gain values. In an aspect, RF front end 588 may use one or more switches 592 to select a particular LNA 590 and its specified gain value based on a desired gain value for a particular application.

Further, for example, one or more PA(s) 598 may be used by RF front end 588 to amplify a signal for an RF output at a desired output power level. In an aspect, each PA 598 may have specified minimum and maximum gain values. In an aspect, RF front end 588 may use one or more switches 592 to select a particular PA 598 and its specified gain value based on a desired gain value for a particular application.

Also, for example, one or more filters 596 can be used by RF front end 588 to filter a received signal to obtain an input RF signal. Similarly, in an aspect, for example, a respective filter 596 can be used to filter an output from a respective PA 598 to produce an output signal for transmission. In an aspect, each filter 596 can be connected to a specific LNA 590 and/or PA 598. In an aspect, RF front end 588 can use one or more switches 592 to select a transmit or receive path using a specified filter 596, LNA 590, and/or PA 598, based on a configuration as specified by transceiver 502 and/or processor 512.

As such, transceiver 502 may be configured to transmit and receive wireless signals through one or more antennas 565 via RF front end 588. In an aspect, transceiver may be tuned to operate at specified frequencies such that base station 105 can communicate with, for example, one or more UEs 110. In an aspect, for example, modem 540 can configure transceiver 502 to operate at a specified frequency and power level based on the base station configuration of the base station 105 and the communication protocol used by modem 540.

In an aspect, modem 540 can be a multiband-multimode modem, which can process digital data and communicate with transceiver 502 such that the digital data is sent and received using transceiver 502. In an aspect, modem 540 can be multiband and be configured to support multiple frequency bands for a specific communications protocol. In an aspect, modem 540 can be multimode and be configured to support multiple operating networks and communications protocols. In an aspect, modem 540 can control one or more components of base station 105 (e.g., RF front end 588, transceiver 502) to enable transmission and/or reception of signals from the network based on a specified modem configuration. In an aspect, the modem configuration can be based on the mode of the modem and the frequency band in use. In another aspect, the modem configuration can be based on base station configuration information associated with base station 105.

Figure 6:
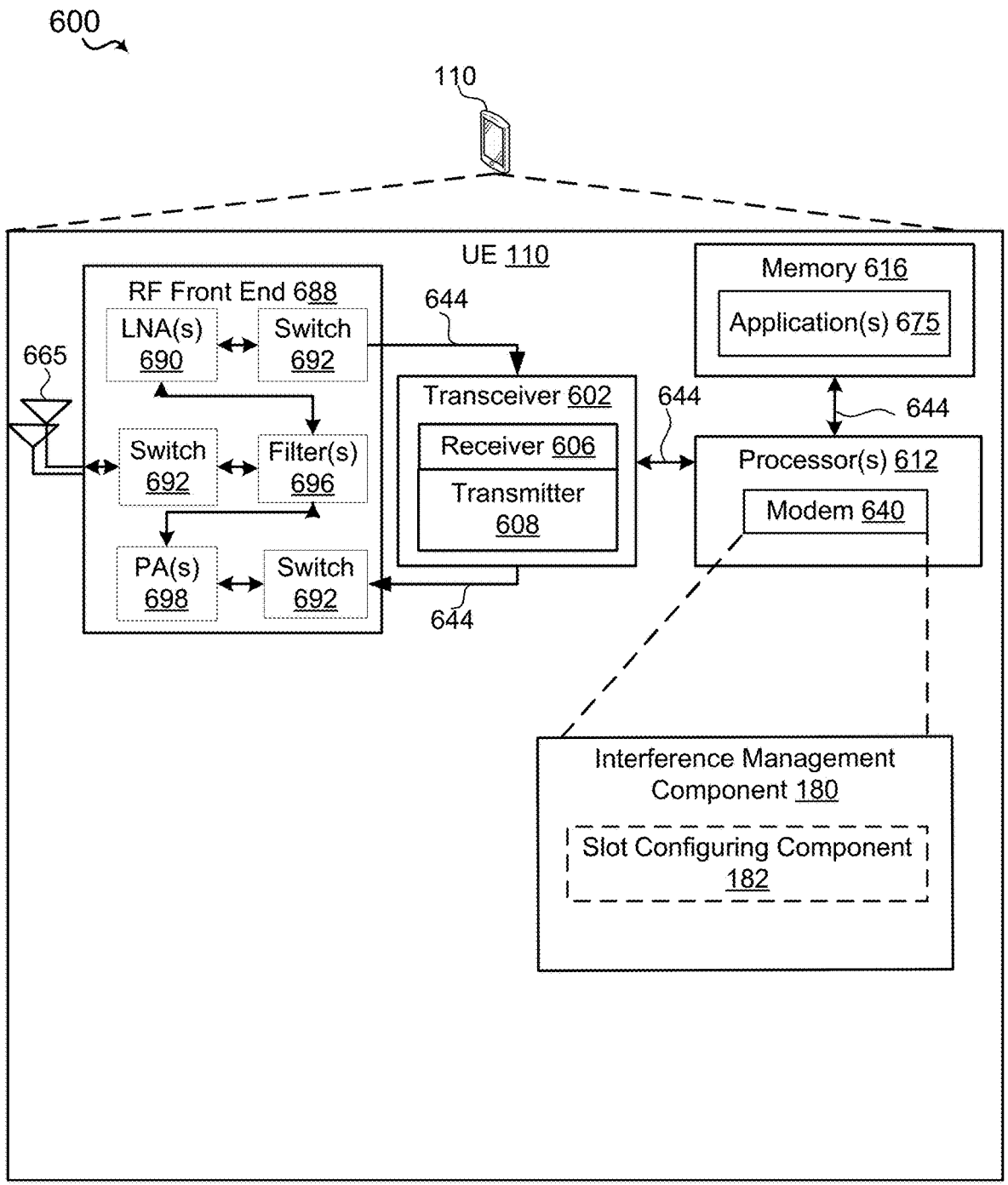
FIG. 6 is a schematic diagram of example components of a user equipment (UE) of FIG. 1.

Referring to FIG. 6, one example of an implementation of UE 110 may include a variety of components, some of which have already been described above, but including components such as one or more processors 612 and memory 616 and transceiver 602 in communication via one or more buses 644, which may operate in conjunction with modem 640. Further, the one or more processors 612, modem 640, memory 616, transceiver 602, RF front end 688 and one or more antennas 665, may be configured to support voice and/or data calls (simultaneously or non-simultaneously) in one or more radio access technologies.

In an aspect, the one or more processors 612 can include a modem 640 that can use one or more modem processors. The various components related to managing interference may be included in modem 640 and/or processors 612 and, in an aspect, can be executed by a single processor, while in other aspects, different ones of the components may be executed by a combination of two or more different processors. For example, in an aspect, the one or more processors 612 may include any one or any combination of a modem processor, or a baseband processor, or a digital signal processor, or a transmit processor, or a receiver processor, or a transceiver processor associated with transceiver 602. In other aspects, some of the features of the one or more processors 612 and/or modem 640 associated with managing interference may be performed by transceiver 602.

Also, memory 616 may be configured to store data used herein and/or local versions of applications 675 being executed by at least one processor 612. Memory 616 can include any type of computer-readable medium usable by a computer or at least one processor 612, such as random access memory (RAM), read only memory (ROM), tapes, magnetic discs, optical discs, volatile memory, non-volatile memory, and any combination thereof. In an aspect, for example, memory 616 may be a non-transitory computer-readable storage medium that stores one or more computer-executable codes, and/or data associated therewith, when UE 110 is operating at least one processor 612 to execute interference management component 180, slot configuring component 182, etc.

Transceiver 602 may include at least one receiver 606 and at least one transmitter 608. Receiver 606 may include hardware, firmware, and/or software code executable by a processor for receiving data, the code comprising instructions and being stored in a memory (e.g., computer-readable medium). Receiver 606 may be, for example, a radio frequency (RF) receiver. In an aspect, receiver 606 may receive signals transmitted by at least one base station 105. Additionally, receiver 606 may process such received signals, and also may obtain measurements of the signals, such as, but not limited to, Ec/Io, SNR, RSRP, RSSI, etc. Transmitter 608 may include hardware, firmware, and/or software code executable by a processor for transmitting data, the code comprising instructions and being stored in a memory (e.g., computer-readable medium). A suitable example of transmitter 608 may including, but is not limited to, an RF transmitter.

Moreover, in an aspect, UE 110 may include RF front end 688, which may operate in communication with one or more antennas 665 and transceiver 602 for receiving and transmitting radio transmissions, for example, wireless communications transmitted by at least one base station 105 or wireless transmissions transmitted by other UEs. RF front end 688 may be connected to one or more antennas 665 and can include one or more low-noise amplifiers (LNAs) 690, one or more switches 692, one or more power amplifiers (PAs) 698, and one or more filters 696 for transmitting and receiving RF signals.

In an aspect, LNA 690 can amplify a received signal at a desired output level. In an aspect, each LNA 690 may have a specified minimum and maximum gain values. In an aspect, RF front end 688 may use one or more switches 692 to select a particular LNA 690 and its specified gain value based on a desired gain value for a particular application.

Further, for example, one or more PA(s) 698 may be used by RF front end 688 to amplify a signal for an RF output at a desired output power level. In an aspect, each PA 698 may have specified minimum and maximum gain values. In an aspect, RF front end 688 may use one or more switches 692 to select a particular PA 698 and its specified gain value based on a desired gain value for a particular application.

Also, for example, one or more filters 696 can be used by RF front end 688 to filter a received signal to obtain an input RF signal. Similarly, in an aspect, for example, a respective filter 696 can be used to filter an output from a respective PA 698 to produce an output signal for transmission. In an aspect, each filter 696 can be connected to a specific LNA 690 and/or PA 698. In an aspect, RF front end 688 can use one or more switches 692 to select a transmit or receive path using a specified filter 696, LNA 690, and/or PA 698, based on a configuration as specified by transceiver 602 and/or processor 612.

As such, transceiver 602 may be configured to transmit and receive wireless signals through one or more antennas 665 via RF front end 688. In an aspect, transceiver may be tuned to operate at specified frequencies such that UE 110 can communicate with, for example, one or more base stations 105 or one or more cells associated with one or more base stations 105. In an aspect, for example, modem 640 can configure transceiver 602 to operate at a specified frequency and power level based on the UE configuration of the UE 110 and the communication protocol used by modem 640.

In an aspect, modem 640 can be a multiband-multimode modem, which can process digital data and communicate with transceiver 602 such that the digital data is sent and received using transceiver 602. In an aspect, modem 640 can be multiband and be configured to support multiple frequency bands for a specific communications protocol. In an aspect, modem 640 can be multimode and be configured to support multiple operating networks and communications protocols. In an aspect, modem 640 can control one or more components of UE 110 (e.g., RF front end 688, transceiver 602) to enable transmission and/or reception of signals from the network based on a specified modem configuration. In an aspect, the modem configuration can be based on the mode of the modem and the frequency band in use. In another aspect, the modem configuration can be based on UE configuration information associated with UE 110 as provided by the network during cell selection and/or cell reselection.

Figure 7:
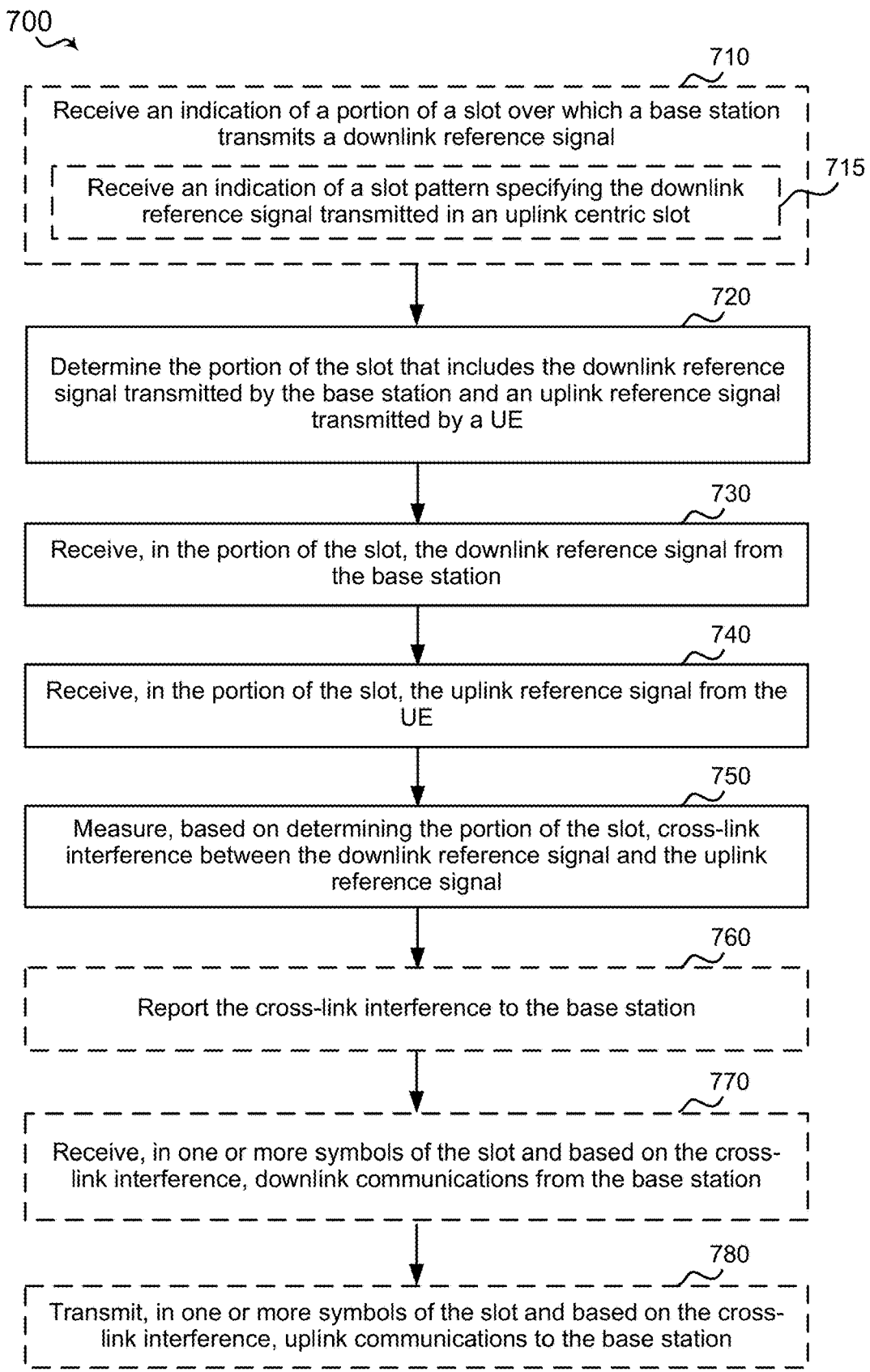
FIG. 7 is a flow diagram of an example of a method for managing interference in wireless communications based on receiving reference signals at a UE.

FIG. 7 illustrates a flowchart of an example of a method 700 for managing (e.g., at a UE) interference in wireless communications.

Figure 12:
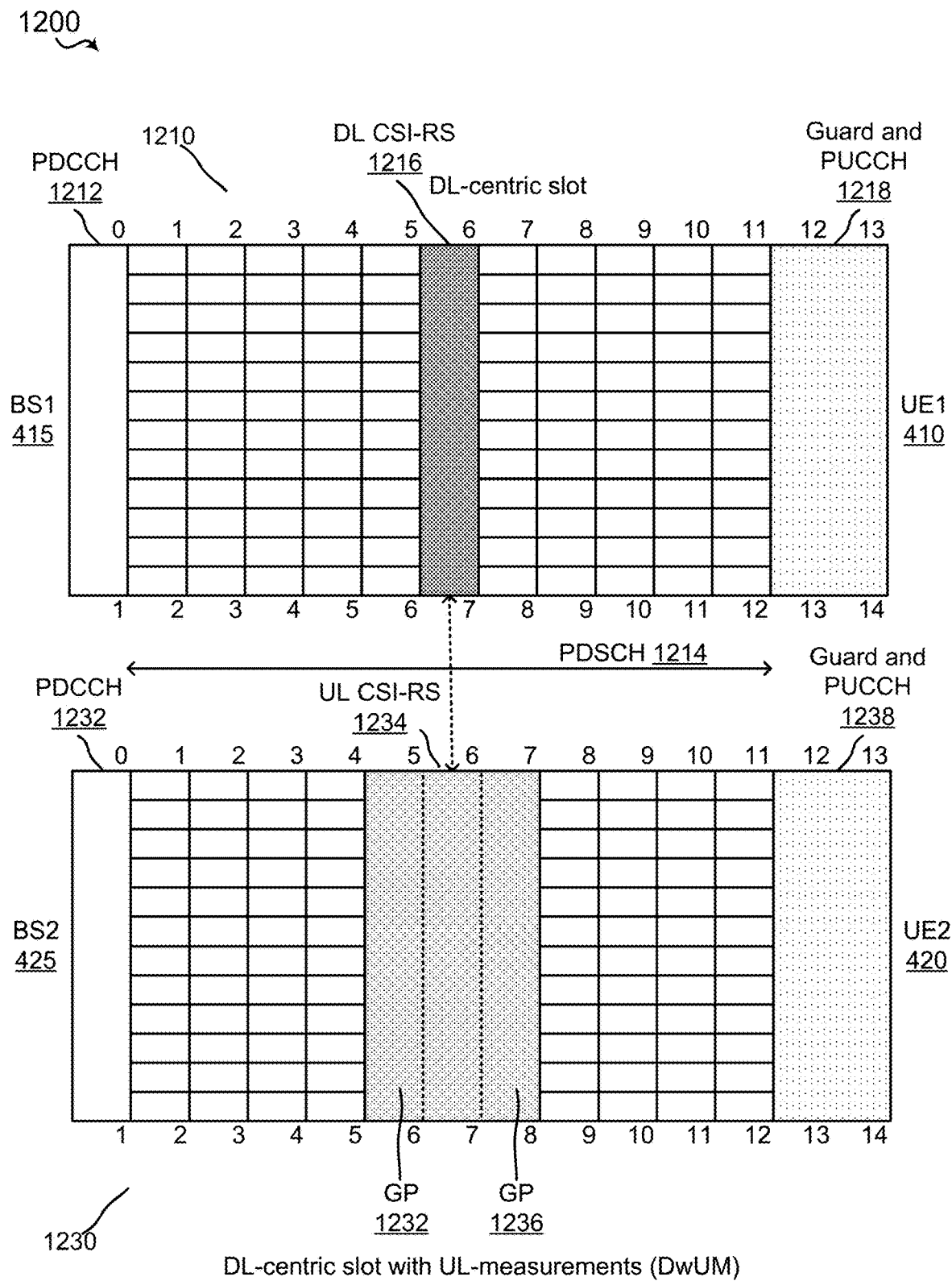
FIG. 12 illustrates an example downlink centric slot pattern which includes transmission of an uplink CSI-RS that overlaps with a downlink CSI-RS in aspects of the present disclosure.
Figure 14:
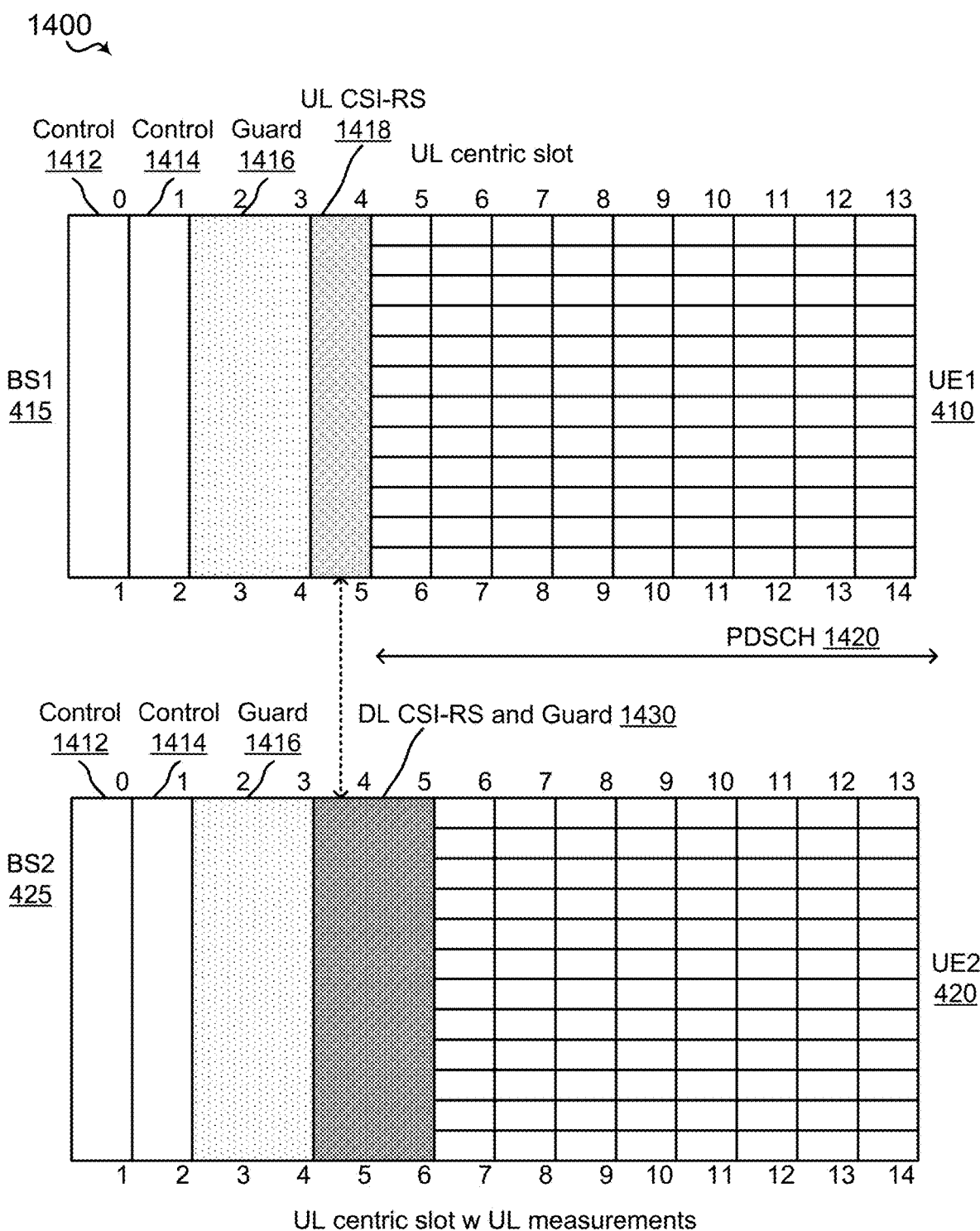
FIG. 14 illustrates a further additional example of an uplink centric slot pattern which includes transmission of an uplink CSI-RS from UE1 that overlaps with a downlink CSI-RS from BS2 in aspects of the present disclosure.

In an aspect, at block 710, method 700 may optionally include receiving an indication of a portion of a slot over which a base station transmits a downlink reference signal. In an aspect, slot configuring component 182, e.g., in conjunction with processor(s) 612, memory 616, transceiver 602, interference management component 180, etc., can receive the indication of the portion of the slot over which the base station transmits the downlink reference signal. For example, slot configuring component 182 can receive the indication from the base station (e.g., a base station 105). In an example, the slot configuring component 182 can receive, from the base station, an indication of a downlink centric slot, which may imply a portion of the slot used for downlink reference signal transmission (e.g., a certain symbol of the slot). An example is shown in FIG. 12 where a DL CSI-RS 1216 is transmitted in symbol 6 of a downlink centric slot. In another example, the slot configuring component 182 can receive, from the base station, an indication of a downlink reference signal to be transmitted in an uplink centric slot. An example is shown in FIG. 14 where a DL CSI-RS 1430 is transmitted in symbol 4 and/or 5 of the uplink centric slot. In either example, slot configuring component 182 can receive the indication as a symbol index, slot configuration or pattern (as described further herein), etc. and can accordingly determine the portion of the symbol over which the downlink reference signal is transmitted.

Receiving the indication at Block 710 may optionally include, at Block 715, receiving an indication of a slot pattern specifying the downlink reference signal transmitted in an uplink centric slot. In an aspect, slot configuring component 182, e.g., in conjunction with processor(s) 612, memory 616, transceiver 602, interference management component 180, etc., can receive the indication of the slot pattern specifying the downlink reference signal transmitted in the uplink centric slot. For example, slot configuring component 182 may receive an indication of the slot pattern, which may indicate a downlink centric or uplink centric configuration of multiple consecutive slots. Slot configuring component 182 may receive the indication of the slot pattern from the base station. In one example, the base station may also be capable of indicating an uplink centric slot with downlink reference signal transmission/measurement (UwDM) and/or a downlink centric slot with uplink reference signal transmission/measurement (DwUM). Thus, for example, the base station may define a downlink-heavy default slot pattern, such as DL, DL, DL, UL, an uplink-heavy converted pattern, such as DwUM, UL, UL, UL, etc. In any case, slot configuring component 182 can receive the slot pattern and determine at least one of whether one or more slots are scheduled to include a downlink reference signal and/or an uplink reference signal based on the slot pattern, a portion of the slot that is to include the reference signal(s), etc.

Method 700 also includes, at Block 720, determining the portion of the slot that includes the downlink reference signal transmitted by the base station and an uplink reference signal transmitted by a UE. In an aspect, slot configuring component 182, e.g., in conjunction with processor(s) 612, memory 616, transceiver 602, interference management component 180, etc., can determine the portion of the slot that includes the downlink reference signal transmitted by the base station and the uplink reference signal transmitted by the UE (e.g., a different UE than UE 110). For example, UE 110 may be UE1 410 in FIG. 4 and the uplink reference signal can correspond to UE2 420 in FIG. 4. In addition, for example, slot configuring component 182 can determine the portion of the slot based at least in part on a received indication (as described), a configured slot pattern, determining whether the slot is a downlink centric or uplink centric slot, etc.

As shown in FIG. 12 where BS2 425 and UE2 420 are switching communications from downlink to uplink in a downlink centric slot, for example, the portion of the slot can include symbol 6 over which a DL CSI-RS 1216 is to be transmitted by the base station (e.g., BS1 415 in FIG. 4) to the UE (e.g., UE1 410 in FIG. 4), and a UL CSI-RS 1234 is to be transmitted by the different UE (e.g., UE2 420 in FIG. 4) to another base station (e.g., BS2 425 in FIG. 4). In this example, slot configuring component 182 can receive an indication that the reference signal(s) are transmitted in symbol 6, or can otherwise determine such, based on determining that the slot is a downlink centric slot.

Figure 13:
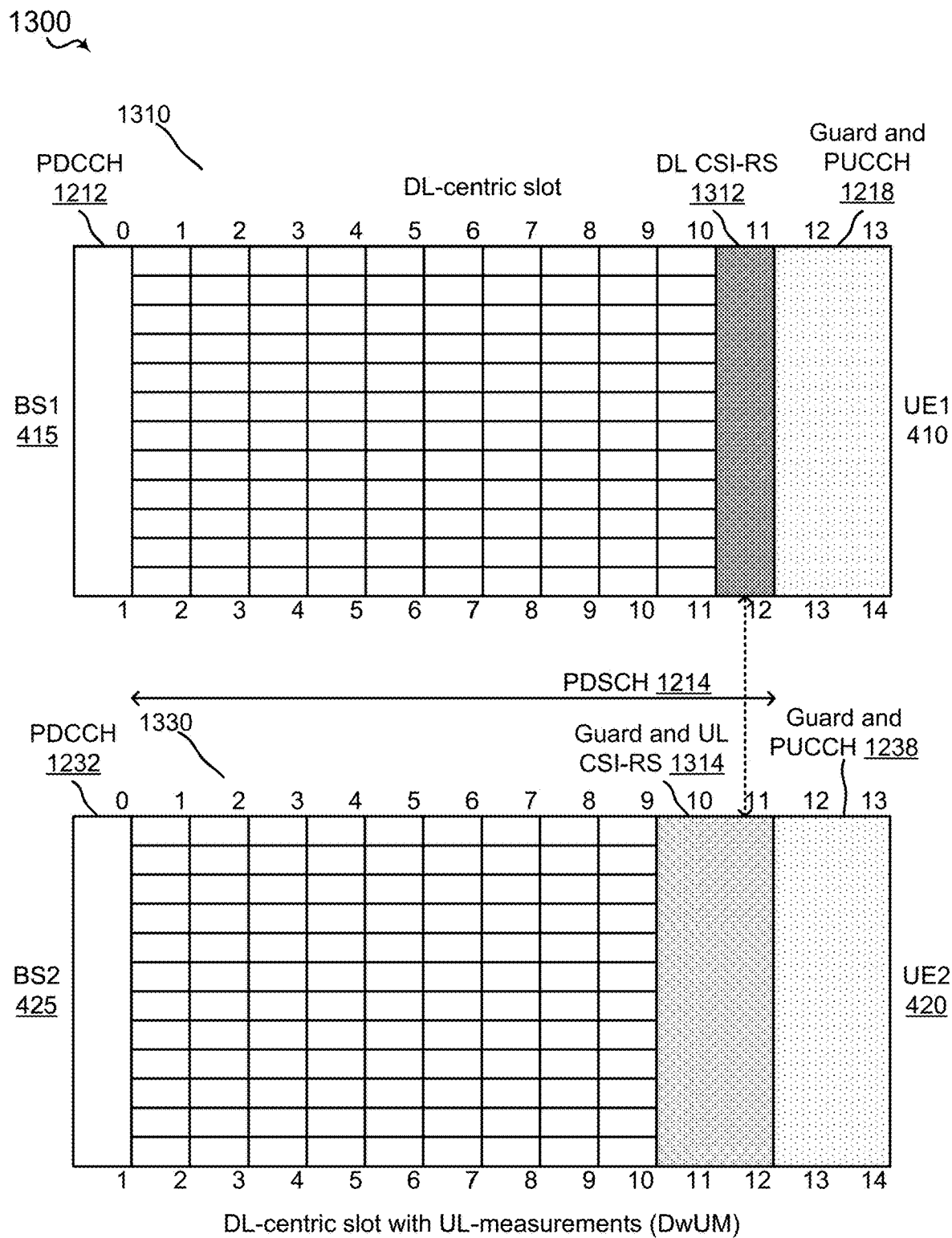
FIG. 13 illustrates an additional example downlink centric slot pattern which includes transmission of an uplink CSI-RS from UE2 that overlaps with a downlink CSI-RS from BS1 in a last PDSCH symbol in aspects of the present disclosure.

As shown in FIG. 13, for example, the portion of the slot can include symbol 11, or otherwise the last symbol used for downlink communications (e.g., for PDSCH 1214), over which a DL CSI-RS 1312 is to be transmitted by the base station (e.g., BS1 415 in FIG. 4) to the UE (e.g., UE1 410 in FIG. 4), and a UL CSI-RS 1314 is to be transmitted by the different UE (e.g., UE2 420 in FIG. 4) to another base station (e.g., BS2 425 in FIG. 4). In this example, slot configuring component 182 can receive an indication that the reference signal(s) are transmitted in the last downlink symbol of the slot, or can otherwise determine such, based on determining that the slot is a downlink centric slot.

As shown in FIG. 14 where BS2 425 and UE2 420 are switching communications from uplink to downlink in an uplink centric slot, for example, the portion of the slot can include symbol 4 over which a UL CSI-RS 1418 is to be transmitted by the UE (e.g., UE1 410 in FIG. 4) to the base station (e.g., BS1 415 in FIG. 4), and a DL CSI-RS 1430 is to be transmitted by another base station (e.g., BS2 425 in FIG. 4) to the different UE (e.g., UE2 420 in FIG. 4). In this example, UE 110 can be the UE 420, and slot configuring component 182 can receive an indication that the reference signal(s) are transmitted in symbol 4, or can otherwise determine such, based on determining that the slot is an uplink centric slot.

Method 700 also includes, at Block 730, receiving, in the portion of the slot, the downlink reference signal from the base station, and at Block 740, receiving, in the portion of the slot, the uplink reference signal from the UE. In an aspect, interference management component 180, e.g., in conjunction with processor(s) 612, memory 616, transceiver 602, etc., can receive, in the portion of the slot, the downlink reference signal from the base station (e.g., BS1 415 in FIG. 4) and the uplink reference signal from the UE (e.g., UE2 420 in FIG. 4). The downlink and uplink reference signals may overlap in at least a portion of the slot (e.g., in time and/or in utilized frequency resources). Using the overlapping signals can allow for determining cross-link interference based on concurrently receiving the reference signals. For example, the reference signals can include CSI-RS, as described.

Method 700 also includes, at Block 750, measuring, based on determining the portion of the slot, cross-link interference between the downlink reference signal and the uplink reference signal. In an aspect, interference management component 180, e.g., in conjunction with processor(s) 612, memory 616, transceiver 602, etc., can measure, based on determining the portion of the slot, the cross-link interference between the downlink reference signal and the uplink reference signal. For example, interference management component 180 can detect the different reference signals received in the portion of the slot, and can determine one or more metrics of the signals to measure the cross-link interference. In an example, interference management component 180 can determine a signal strength (e.g., reference signal received power (RSRP), reference signal received quality (RSRQ), received signal strength indicator (RSSI), etc. In another example, interference management component 180 can compare the signal strengths of the reference signals to determine the cross-link interference. In yet another example, interference management component 180 can determine the minimum mean squared error (MMSE) equalizer filter for minimizing cross-link interference and/or associated post-MMSE signal-to-interference-and-noise ratio (SINR) for computing and reporting channel state information (CSI), channel quality indicator (CQI), etc., that may be appropriate for use in the presence of cross-link interference. As described herein, the cross-link interference or related parameters can then be used or reported in interference cancellation for subsequent communications received from the base station, used in scheduling resources by the base station, and/or the like.

In this regard, method 700 may optionally include, at Block 760, reporting the cross-link interference to the base station. In an aspect, interference management component 180, e.g., in conjunction with processor(s) 612, memory 616, transceiver 602, etc., can report the cross-link interference to the base station (or related parameters, such as CSI, CQI, etc.), and the base station may schedule the UE 110 around resources having at least a threshold level of cross-link interference such to avoid interference from uplink signals of neighboring UEs. For example, interference management component 180 can report the cross-link interference as a signal strength or other metric of the uplink reference signal, a signal strength or other metric of the downlink reference signal, a comparison between the uplink and downlink reference signals, etc.

Method 700 may also optionally include, at Block 770, receiving, in one or more symbols of the slot and based on the cross-link interference, downlink communications from the base station. In an aspect, transceiver 602, e.g., in conjunction with processor(s) 612, memory 616, etc., can receive, in the one or more symbols of the slot and based on the cross-link interference, downlink communications from the base station. For example, transceiver 602 can receive downlink communications from the base station in resources scheduled based on the cross-link interference. In addition, where the slot is a downlink centric slot, the transceiver 602 can receive the downlink communications in the one or more symbols, which may also be based on CSI reported by the UE based on the downlink reference signal received from the base station (e.g., at Block 730).

Method 700 may also optionally include, at Block 780, transmitting, in one or more symbols of the slot and based on the cross-link interference, uplink communications to the base station. In an aspect, transceiver 602, e.g., in conjunction with processor(s) 612, memory 616, etc., can transmit, in the one or more symbols of the slot and based on the cross-link interference, uplink communications to the base station. Thus, for example, where the UE is UE2 420 switching from uplink to downlink communications in an uplink centric slot, interference management component 180 can receive the UL CSI-RS from neighboring UEs and DL CSI-RS from a serving base station in the slot, and can use the measured cross-link interference in transmitting uplink communications to the serving base station in a subsequent symbol of the slot and/or a next slot. For example, the UE can determine resources to utilize based on the cross-link interference, transmit power based on the cross-link interference, etc.

Figure 8:
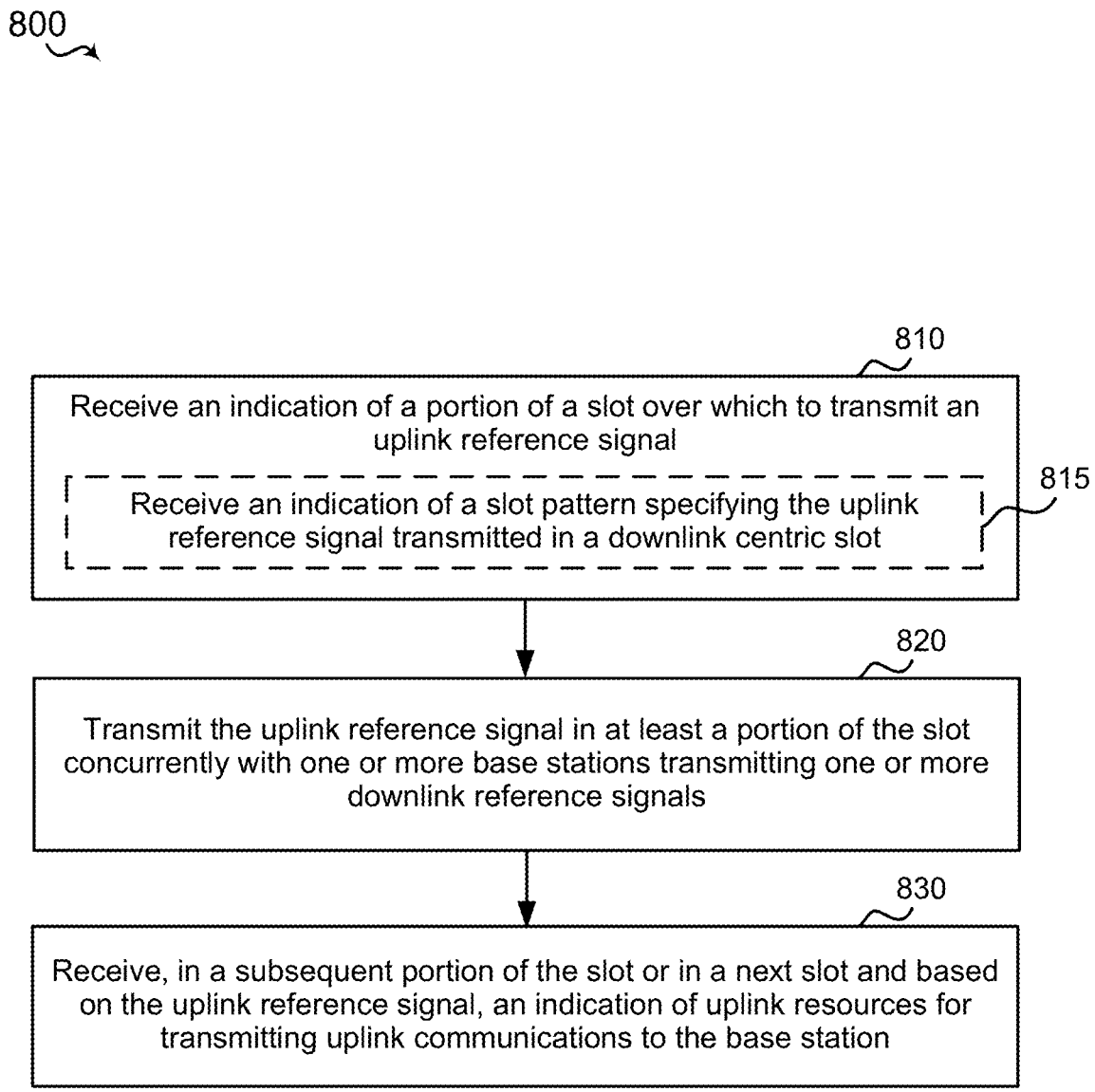
FIG. 8 is a flow diagram of an example of a method for managing interference in wireless communications based on transmitting reference signals by a UE.

FIG. 8 illustrates a flowchart of an example of a method 800 for managing (e.g., at a UE) interference in wireless communications.

In an aspect, at block 810, method 800 may include receiving an indication of a portion of a slot over which to transmit an uplink reference signal. In an aspect, slot configuring component 182, e.g., in conjunction with processor(s) 612, memory 616, transceiver 602, interference management component 180, etc., can receive the indication of the portion of the slot over which to transmit the uplink reference signal. For example, slot configuring component 182 can receive the indication from the base station (e.g., a base station 105). For example, as shown in FIG. 12, the base station (e.g., BS2 425) can configure the UE (e.g., UE2 420) to transmit the UL CSI-RS 1234 in symbol 6 of the slot. In another example, the slot configuring component 182 can receive, from the base station, a slot configuration or pattern (as described further herein), indicating a DwUM slot, and can accordingly determine the portion of the symbol over which the uplink reference signal is to be transmitted.

Receiving the indication at Block 810 may optionally include, at Block 815, receiving an indication of a slot pattern specifying the uplink reference signal transmitted in a downlink centric slot. In an aspect, slot configuring component 182, e.g., in conjunction with processor(s) 612, memory 616, transceiver 602, interference management component 180, etc., can receive the indication of the slot pattern specifying the uplink reference signal transmitted in the downlink centric slot. For example, slot configuring component 182 may receive an indication of the slot pattern, which may indicate a downlink centric or uplink centric configuration of multiple consecutive slots, as described above. Slot configuring component 182 may receive the indication of the slot pattern from the base station, which may indicate UwDM, DwUM, DL, or UL slot(s) in the slot pattern. In any case, slot configuring component 182 can receive the slot pattern and determine at least one of whether one or more slots are scheduled to include a downlink reference signal and/or an uplink reference signal (to be transmitted by the UE 110) based on the slot pattern, a portion of the slot that is to include the reference signal(s), etc.

Method 800 also includes, at Block 820, transmitting the uplink reference signal in at least a portion of the slot concurrently with one or more base stations transmitting one or more downlink reference signals. In an aspect, transceiver 602, e.g., in conjunction with processor(s) 612, memory 616, etc., can transmit the uplink reference signal in at least a portion of the slot concurrently with one or more base stations transmitting one or more downlink reference signals. As described, this can allow receiving devices to measure cross-link interference to the UE(s) and/or base station(s) transmitting the reference signals.

Method 800 also includes, at Block 830, receiving, in a subsequent portion of the slot or in a next slot and based on the uplink reference signal, an indication of uplink resources for transmitting uplink communications to the base station. In an aspect, transceiver 602, e.g., in conjunction with processor(s) 612, memory 616, etc., can receive, in the subsequent portion of the slot or in the next slot and based on the uplink reference signal, the indication of uplink resources for transmitting uplink communications to the base station. For example, as described, the base station can schedule the resources around resources used by the other base stations based on determining the cross-link interference from the other base stations achieves a threshold. The UE can transmit uplink communications to the base station over the resources.

Figure 9:
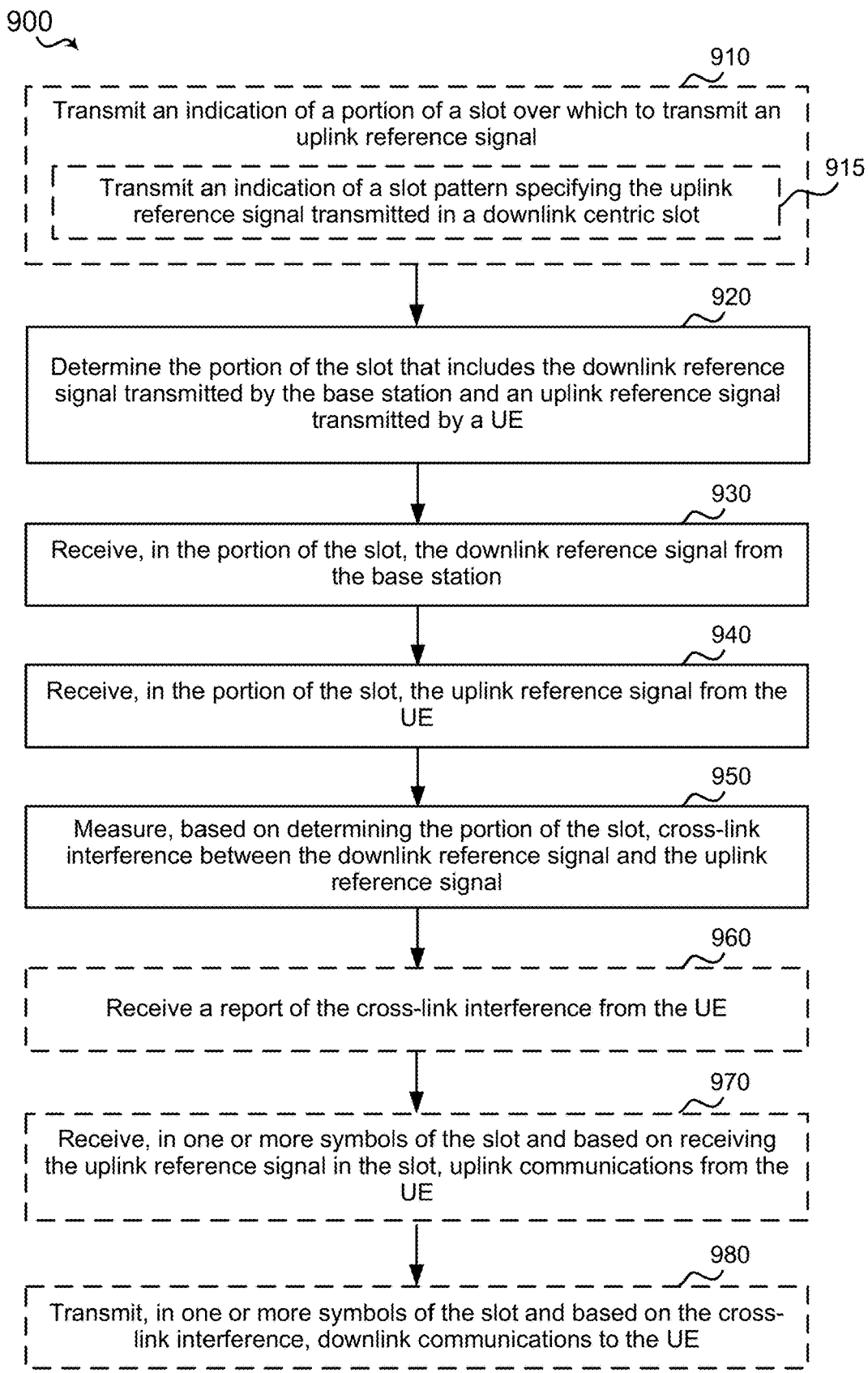
FIG. 9 is a flow diagram of an example of a method for managing interference in wireless communications based on receiving reference signals at a base station.

FIG. 9 illustrates a flowchart of an example of a method 900 for managing (e.g., at a base station) interference in wireless communications.

In an aspect, at Block 910, method 900 may optionally include transmitting an indication of a portion of a slot over which to transmit an uplink reference signal. In an aspect, interference management component 150, e.g., in conjunction with processor(s) 512, memory 516, transceiver 502, etc. can transmit the indication of the portion of the slot over which to transmit the uplink reference signal. For example, as described, interference management component 150 can transmit the indication as an indication of a symbol within the slot, an indication of the slot to include the uplink reference signal, an indication of a selected slot pattern (e.g., where one slot is indicated as DwUM), etc. Thus, transmitting the indication at Block 910 may optionally include, at Block 915, transmitting an indication of a slot pattern specifying the uplink reference signal transmitted in a downlink centric slot. In an aspect, interference management component 150, e.g., in conjunction with processor(s) 512, memory 516, transceiver 502, etc. can transmit the indication of the slot pattern specifying the uplink reference signal transmitted in the downlink centric slot.

As described, the base station may define a downlink-heavy default slot pattern, such as DL, DL, DL, UL, an uplink-heavy converted pattern, such as DwUM, UL, UL, UL, etc. For example, the base station (or network) can select a slot pattern based on DL-to-UL traffic ratio (e.g., after adjusting for DL-to-UL spectral efficiency ratio), feedback received (e.g., over backhaul) from neighboring base stations with respect to cross-link interference experienced at the neighboring base stations, etc. Thus, in one example, the base stations can compare their spectral efficiency during convertible slots (e.g., slots 1 and 4 in the examples above) and/or non-convertible slots (e.g., slots 2 and 3 in the examples above) to assess the experienced cross-link interference. This scheme may not require UwDM slots and may make possible sounding of a supers of UEs and down-selecting UEs that are most compatible. Having accurate CSI reports, in this example, may result from base stations committing to UEs by sounding on the downlink and uplink during downlink and DwUM slots, respectively. If patterns such as DL, DL, DL, DL, UL and DwUM, DwUM, UL, UL, UL are used, it may be possible to sound superset of UEs on first DwUM slot and then down-select and commit on second DwUM. This may enable schedulers to select most compatible UEs on the uplink and downlink to increase performance. In any case, interference management component 150 can select the slot pattern based on such considerations.

Method 900 can also include, at Block 920, determining the portion of the slot that includes the downlink reference signal transmitted by the base station and an uplink reference signal transmitted by a UE. In an aspect, interference management component 150, e.g., in conjunction with processor(s) 512, memory 516, transceiver 502, etc. can determine the portion of the slot that includes the downlink reference signal transmitted by the base station and the uplink reference signal transmitted by the UE. For example, interference management component 150 can determine the portion of the slot based on a format of the slot (e.g., downlink centric or uplink centric, DwUM, UwDM, etc.), a selected slot pattern, etc. In addition, interference management component 150 can determine the portion of the slot as indicated in transmitting the indication to the UE, as described.

Method 900 can also include, at Block 930, receiving, in the portion of the slot, the downlink reference signal from the base station, and at Block 940, receiving, in the portion of the slot, the uplink reference signal from the UE. In an aspect, interference management component 150, e.g., in conjunction with processor(s) 512, memory 516, transceiver 502, etc., can receive, in the portion of the slot, the downlink reference signal from the base station (e.g., BS1 415 in FIG. 4) and the uplink reference signal from the UE (e.g., UE2 420 in FIG. 4). The downlink and uplink reference signals may overlap in at least a portion of the slot (e.g., in time and/or in utilized frequency resources). Using the overlapping signals can allow for determining cross-link interference based on concurrently receiving the reference signals. For example, the reference signals can include CSI-RS, as described.

Method 900 also includes, at Block 950, measuring, based on determining the portion of the slot, cross-link interference between the downlink reference signal and the uplink reference signal. In an aspect, interference management component 150, e.g., in conjunction with processor(s) 512, memory 516, transceiver 502, etc., can measure, based on determining the portion of the slot, the cross-link interference between the downlink reference signal and the uplink reference signal. For example, interference management component 150 can detect the different reference signals received in the portion of the slot, and can determine one or more metrics of the signals to measure the cross-link interference. In an example, interference management component 150 can determine a signal strength (e.g., RSRP, RSRQ, RSSI, etc.). In another example, interference management component 150 can compare the signal strengths of the reference signals to determine the cross-link interference. As described herein, the cross-link interference can then be used in interference cancellation for subsequent communications transmitted by the base station, to schedule certain resources to a UE served by the base station, etc.

Method 900 optionally includes, at Block 960, receiving a report of the cross-link interference from the UE. In an aspect, interference management component 150, e.g., in conjunction with processor(s) 512, memory 516, transceiver 502, etc., can receive the report of the cross-link interference from the UE (e.g., UE1 410 in FIG. 4). In this regard, interference management component 150 can schedule resources for communicating with the UE based on the measured or reported cross-link interference.

Method 900 may also optionally include, at Block 970, receiving, in one or more symbols of the slot and based on receiving the uplink reference signal in the slot, uplink communications from the UE. In an aspect, transceiver 502, e.g., in conjunction with processor(s) 512, memory 516, etc., can receive, in the one or more symbols of the slot and based on receiving the uplink reference signal in the slot, uplink communications from the UE. For example, transmitting the indication of the portion of the slot over which an uplink reference signal is to be transmitted can be a part of (or an indication of) switching the slot to uplink communications. Accordingly, transceiver 502 may transmit a scheduling grant to the UE for uplink resources after the switching, and may receive uplink communications from the UE over the uplink resources. In one example, the switching, and thus the resources, may be symbols in the slot, or a next slot.

Method 900 may also optionally include, at Block 980, transmitting, in one or more symbols of the slot and based on cross-link interference, downlink communications to the UE. In an aspect, transceiver 502, e.g., in conjunction with processor(s) 512, memory 516, etc., can transmit, in one or more symbols of the slot and based on cross-link interference, downlink communications to the UE. Thus, for example, where the base station is BS2 425 switching from uplink to downlink communications in an uplink centric slot, interference management component 150 can receive the UL CSI-RS from the served UE and DL CSI-RS from another base station in the slot, and can use the measured cross-link interference in transmitting downlink communications to the served UE in a subsequent symbol of the slot and/or a next slot. For example, the base station can determine resources to utilize based on the cross-link interference, transmit power based on the cross-link interference, etc.

Figure 10:
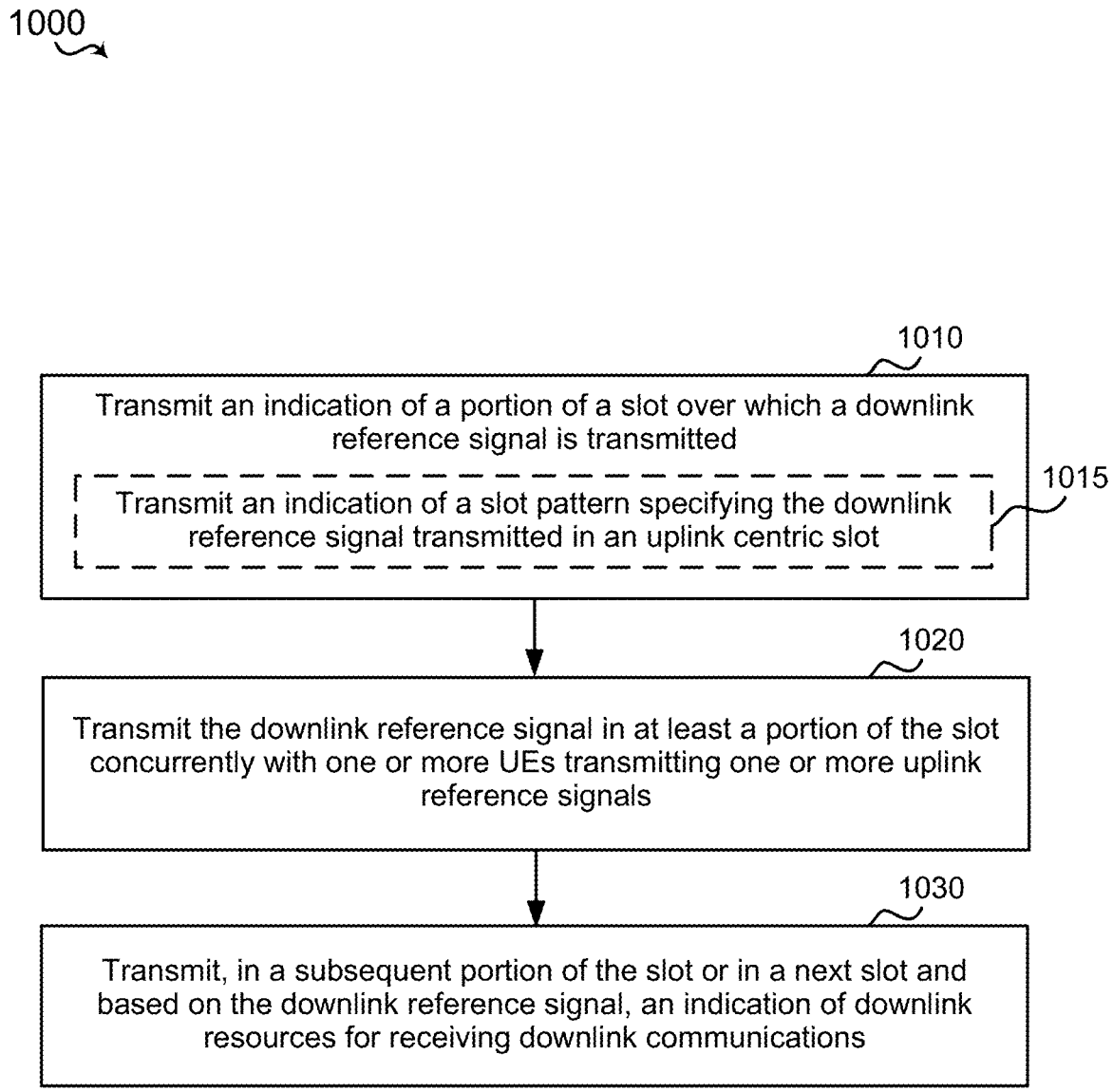
FIG. 10 is a flow diagram of an example of a method for managing interference in wireless communications based on transmitting reference signals by a base station.

FIG. 10 illustrates a flowchart of an example of a method 1000 for managing (e.g., at a base station) interference in wireless communications.

In an aspect, at block 1010, method 1000 may include transmitting an indication of a portion of a slot over which a downlink reference signal is transmitted. In an aspect, selecting component 152, e.g., in conjunction with processor(s) 512, memory 516, transceiver 502, interference management component 150, etc., can transmit the indication of the portion of the slot over which the downlink reference signal is transmitted. For example, selecting component 152 can transmit the indication based on a determined symbol to use for transmitting the downlink reference signal, which may be based on a selected slot configuration, slot pattern, etc., as described. For example, as shown in FIG. 12, the base station (e.g., BS1 415) can configure transmission of the DL CSI-RS 1216 in symbol 6 of the slot, and may transmit an indication of the symbol. In another example, the selecting component 152 can indicate a UwDM slot, and can accordingly determine and indicate the portion of the symbol over which the downlink reference signal is to be transmitted over.

Transmitting the indication at Block 1010 may optionally include, at Block 1015, transmitting an indication of a slot pattern specifying the downlink reference signal transmitted in an uplink centric slot. In an aspect, selecting component 152, e.g., in conjunction with processor(s) 512, memory 516, transceiver 502, interference management component 150, etc., can transmit the indication of the slot pattern specifying the downlink reference signal transmitted in the uplink centric slot. For example, selecting component 152 may transmit an indication of the slot pattern, which may indicate a downlink centric or uplink centric configuration of multiple consecutive slots, as described above. Selecting component 152 may transmit the indication of the slot pattern from the base station, which may indicate UwDM, DwUM, DL, or UL slot(s) in the slot pattern.

Method 1000 also includes, at Block 1020, transmitting the downlink reference signal in at least a portion of the slot concurrently with one or more UEs transmitting one or more uplink reference signals. In an aspect, transceiver 502, e.g., in conjunction with processor(s) 512, memory 516, etc., can transmit the downlink reference signal in at least a portion of the slot concurrently with one or more UEs transmitting one or more uplink reference signals. As described, this can allow receiving devices to measure cross-link interference to the UE(s) and/or base station(s) transmitting the reference signals.

Method 1000 also includes, at Block 1030, transmitting, in a subsequent portion of the slot or in a next slot and based on the downlink reference signal, an indication of downlink resources for receiving downlink communications. In an aspect, transceiver 502, e.g., in conjunction with processor(s) 512, memory 516, etc., can transmit, in the subsequent portion of the slot or in the next slot and based on the downlink reference signal, the indication of downlink resources for receiving downlink communications. For example, as described, the base station can schedule the resources around resources used by the other base stations based on determining the cross-link interference from the other base stations achieves a threshold. The base station can transmit downlink communications to the UE over the resources.

Figure 11:
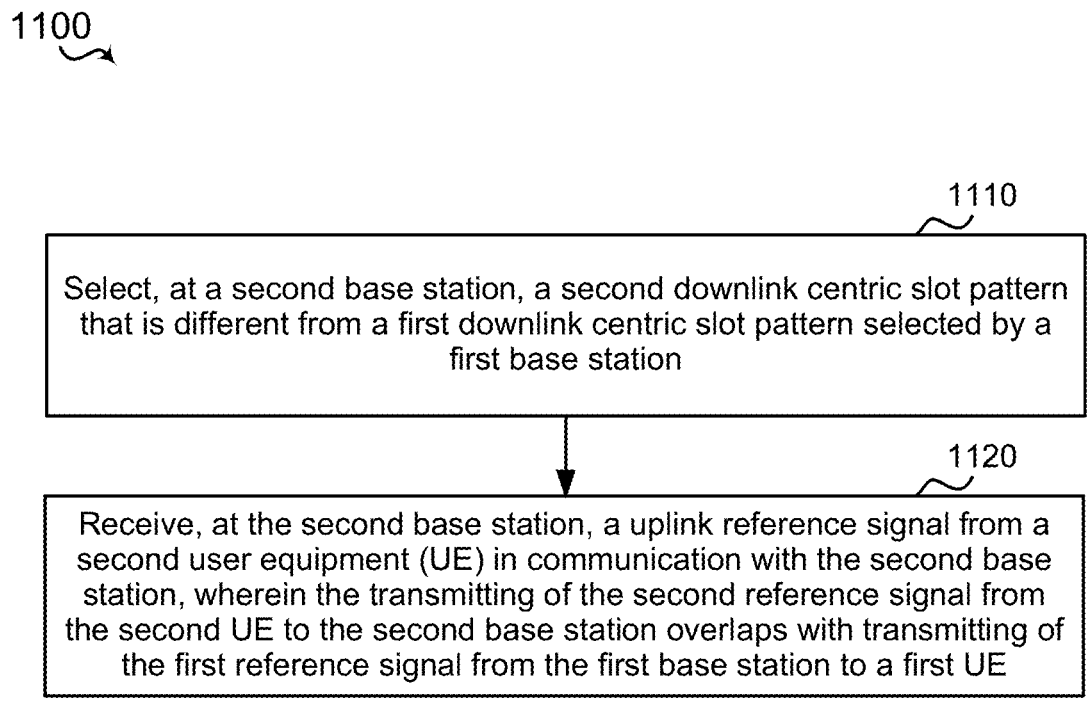
FIG. 11 is a flow diagram of an example of a method for managing interference in wireless communications based on selecting slot patterns by a base station.

FIG. 11 illustrates a flowchart of an example of a method 1100 for managing interference in a dynamic TDD wireless communications network.

In an aspect, at block 1110, method 1100 may include selecting, at a second base station, a second downlink centric slot pattern that is different from a first downlink centric slot pattern selected by a first base station. For example, in an aspect, base station 105 (e.g., base station 425 of FIGS. 4-6) and/or interference management component 150 may include a selecting component 152, such as a specially programmed processor module, or a processor executing specially programmed code stored in a memory to select, at a second base station, a second downlink centric slot pattern, e.g., as shown in 1230 of FIG. 12 or 1330 of FIG. 13 that is different from a first downlink centric slot pattern (e.g., as shown 1210 of FIG. 12 or 1310 of FIG. 13) selected by a first base station (e.g., BS1 (415)).

In an aspect, at block 1120, method 1100 may include receiving, at the second base station, an uplink reference signal from a second UE in communication with the second base station, wherein transmitting of the second reference signal from the second UE to the second base station overlaps with transmitting of the first reference signal from the first base station to a first UE. For example, in an aspect, base station 105 and/or interference management component 150 may include a receiving component 154, such as a specially programmed processor module, or a processor executing specially programmed code stored in a memory to receive, at the second base station (e.g., base station 425 of FIGS. 4-6), an uplink reference signal (e.g., 1234 of FIG. 12 or 1314 of FIG. 13) from a second user equipment (UE) (e.g., UE2 (420) of FIGS. 12 and 13) in communication with the second base station, wherein transmitting of the second reference signal from the second UE to the second base station overlaps with transmitting of the first reference signal from the first base station to a first UE.

In an aspect, a scheduler at a base station may determine slot pattern used by the base station based on ratio of uplink and downlink data, spectral efficiency, and/or ratio of slots used, etc.

Although method 1100 is described from the perspective of a base station, the technique described above works from a UE perspective as well.

FIG. 12 illustrates an example downlink centric slot pattern 1200 which includes transmission of an uplink CSI-RS from UE2 (420) to BS2 (425) that overlaps with a downlink CSI-RS from BS1 (415) to UE1 (410) in aspects of the present disclosure.

As illustrated in 1210 of FIG. 12, BS1 (415) may transmit PDCCH 1212, PDSCH 1214, and/or guard and PUCCH 1218 (which may include one or more guard symbols over which nothing is transmitted). PDSCH 1214 may include a downlink reference signal 1216. Downlink reference signal 1216 may be a channel state information-reference signal transmitted using a resource element as described above in reference to FIG. 3A. A guard period of guard and PUCCH 1218 may separate PDSCH 1214 and PUCCH.

In an aspect, prior to converting a downlink centric slot to an uplink centric slot, BS2 (425) may configure a preceding (e.g., an immediately preceding) downlink centric slot as downlink centric slot with uplink measurements, e.g., DwUM slot, as shown in 1230. The design shown in 1230 is just one example, and various designs may be implemented. The example shown in 1230 allows UE2 (420) to send an uplink reference signal 1234, e.g., an uplink CSI-RS, that is overlapping with a downlink reference signal 1216 sent from BS1 (415) to UE1 (410). That is, the transmitting of the uplink reference signal 1234 overlaps with the transmitting of the downlink reference signal 1216. Moreover, this allows or enables the BS2 (425) and/or UE1 (410) to measure cross-link or mixed interference that would be encountered in the following slot if BS2 (425) converts the slot to an uplink centric slot (e.g. from a downlink centric slot). In other words, BS2 (425) and/or UE1 (410) can estimate channel responses to their respective transmitters, e.g., UE2 (420) and/or BS1 (415), respectively. Additionally, guard periods 1232 and/or 1236 can be inserted prior to and after the transmission of uplink reference signal 1234 to allows for switching between DL/UL and/or UL/DL.

Additionally, UE1 (410) may measure cross-link or mixed interference 436 and may report the mixed interference 436, as shown in FIG. 4, to BS1 (415) via a measurement report (e.g., CSI-RS report). Thus, both BSs 425 and 415 can measure the anticipated interference in a following slot if BS2 performs a slot conversion in the following slot.

Further, the mechanism described above applies to uplink centric slots where a second base station, e.g., BS2 (425) sends a downlink reference signal to interfere with an uplink reference signal transmitted from UE1 (410) to BS1 (415). In such an aspect, for example, uplink centric slot associated with BS2 (425) may be configured as an uplink centric slot with downlink measurements, e.g., UwDM slot.

In one example, configuring the uplink CSI-RS transmission in a similar symbol as DL CSI-RS transmissions can produce no or minimal overhead for the default direction (e.g., the BS1 415 to UE1 410 downlink communications). In other words, no additional gaps or signaling (e.g., RTS/CTS) may be required to accommodate the scheduled uplink CSI-RS. In addition, legacy base stations and/or UEs may be unaffected by this mechanism, and thus need not require modification. This may also allow for dynamic measurement of cross-link interference that can take into account both pathloss and beam directionality as well as relevant base stations and UEs (e.g., the BS/UEs that are within a threshold range and/or are about to be scheduled).

Additionally, configuring the uplink CSI-RS transmission in a similar symbol as DL CSI-RS, in this regard, allows for more accurate CSI-reports to protect the default direction transport blocks (TB) from corruption due to excessive cross-link interference, which can avoid undesired rate-controller behavior such as large back-offs resulting from modulation and coding scheme (MCS) drops and gradual climbing back up. For example, rather than relying on converting base stations/UEs to yield, or interference suppression, this enables base stations to avoid scheduling non-compatible UEs simultaneously. Moreover, there may be no need for UE-to-UE or BS-to-BS interference measurement slots, and no requirement for explicit over-the-air (OTA)/backhaul messages to report interference measurements. In one example, the base stations can share CSI reports or amounts of measured cross-link interference they experience over backhaul for improved scheduling decision and performance.

FIG. 13 illustrates an additional example downlink centric slot pattern 1300 which includes transmission of an uplink CSI-RS from UE2 (420) to BS2 (425) that overlaps with a downlink CSI-RS from BS1 (415) to UE1 (410) in a last PDSCH symbol in aspects of the present disclosure.

As illustrated in 1310 of FIG. 13, BS1 (415) may transmit PDCCH 1212, PDSCH 1214, and/or guard and PUCCH 1218. PDSCH 1214 may include a downlink reference signal 1312 transmitted in a last symbol of PDSCH 1214. Downlink reference signal 1312 may be a channel state information-reference signal transmitted using a resource element as described above in reference to FIG. 3A. A guard period of guard and PUCCH 1218 may separate PDSCH 514 and PUCCH.

In an aspect, prior to converting a downlink centric slot to an uplink centric slot, BS2 (425) may configure an immediately preceding downlink centric slot as downlink centric slot with uplink measurements, e.g., DwUM slot, as shown in 1330. The design shown in 1330 is an additional example. The example shown in 1330 allows UE2 (420) to send an uplink reference signal 1314, e.g., an uplink CSI-RS, that is overlapping with a downlink reference signal 1312 sent from BS1 (415) to UE1 (410) in a last symbol of PDSCH 1214. This requires no additional Rx-to-TX switches at UE2 (420) and/or reduce overhead in a DwUM to just one additional gap, e.g., one additional symbol. In an additional aspect, BS1 (415) may insert an additional gap (e.g., one symbol in length) between downlink CSI-RS 1312 and an OFDM symbol preceding CSI-RS 1312. This can allow the DL and UL CSI-RS symbols to be better aligned (e.g., aligned within one cyclic prefix for both UE1 and BS2).

FIG. 14 illustrates a further additional example of an uplink centric slot pattern 1400 which includes transmission of an uplink CSI-RS from UE1 (410) to BS1 (415) that overlaps with a downlink CSI-RS from BS2 (425) to UE2 (420) in aspects of the present disclosure. In the UL centric slot, UE 410 can transmit control 1412 and 1414 symbols, followed by a guard period 1416, and then a UL CSI-RS 1418. PUSCH data can follow the CSI-RS 1418. UE2 420 can similarly transmit control 1412, 1414, and guard period 1416, but then BS2 435 can transmit a DL-CSI-RS to overlap the UL CSI-RS 1418 from UE1 410, as described, in switching the uplink centric slot to downlink for BS2 425 and UE2 420. Thus, after the DL CSI-RS 1430, BS2 425 can transmit PDSCH 1420.

In an aspect, prior to converting an uplink centric slot to a downlink centric slot, BS2 (425) may transmit a downlink reference signal 1430 to UE2 (420) during a time period that overlaps with transmission of an uplink reference signal 1418 from UE1 (410) to BS1 (415). This allows BS1 (415) and UE2 (420) to estimate channel response to their respective transmitter, similar to the way described above in reference to FIGS. 12 and 13, to measure cross-link interference, etc., which can be reflected in CSI reports. In an example, the DL CSI-RS 1430 can be put in different places in an attempt to align the DL CSI-RS 1430 with UL CSI-RS 1418. In an example, BS2 425 can place the DL CSI-RS 1430 upfront and after the gap to save the BS and UE in number of RX-to-TX/TX-to-RX switches and gaps. In another example, UE1 410 (e.g., based on scheduling by the BS1 415 or otherwise) can advance the UL CSI-RS slightly (e.g., in an advanced position within the symbol) causing a gap between UL CSI-RS 1418 and the symbol following it to help the BS2 425 better align its DL CSI-RS 1430 to the UL CSI-RS 1418 without incurring additional gap in UwDM. This can allow the DL and UL CSI-RS symbols to be aligned within one cyclic prefix in both UE1 and BS2.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method for measuring cross-link interference in wireless communications, comprising:
    transmitting, by a first base station to a user equipment (UE), a configuration including an indication of a slot pattern for communicating over multiple slots over a period of time, wherein the slot pattern specifies each of the multiple slots as being one of a downlink slot, an uplink slot, or a downlink-centric slot with an uplink measurement, and wherein the slot pattern identifies at least a first slot of the multiple slots as a downlink slot, at least a second slot of the multiple slots as an uplink slot, and at least a third slot of the multiple slots as a downlink-centric slot with an uplink measurement;
    determining, by the first base station and based at least in part on determining that the configuration indicates a slot in the multiple slots as being a downlink-centric slot with an uplink measurement, a portion of the slot that includes a downlink reference signal transmitted by a second base station and an uplink reference signal transmitted by the UE, wherein the uplink reference signal and the downlink reference signal at least partially overlap within the portion of the slot;
    receiving, by the first base station and in the portion of the slot, the downlink reference signal from the second base station;
    receiving, by the first base station and in the portion of the slot, the uplink reference signal from the UE; and
    measuring, based on determining the portion of the slot, cross-link interference between the downlink reference signal and the uplink reference signal.

2. The method of claim 1, further comprising receiving, from the second base station, an indication that the second base station transmits the downlink reference signal in the portion of the slot.

3. The method of claim 1, further comprising receiving, in one or more symbols of the slot and based at least in part on receiving the downlink reference signal in the slot, downlink communications from the second base station.

4. The method of claim 3, further comprising determining one or more guard symbols before and adjacent to the portion of the slot that includes the downlink reference signal.

5. The method of claim 1, further comprising scheduling the UE to transmit the uplink reference signal in the portion of the slot.

6. The method of claim 5, further comprising scheduling one or more gaps in symbols adjacent to the portion of the slot.

7. The method of claim 5, further comprising scheduling, within the slot or in a next slot and based on measuring the cross-link interference, resources for uplink communications from the UE.

8. The method of claim 5, further comprising receiving, in at least one of a next slot or one or more symbols of the slot following the portion of the slot, and based on the uplink reference signal, uplink data communications from the UE.

9. The method of claim 5, further comprising scheduling the UE to transmit the uplink reference signal in an advanced position of the portion of the slot to cause a gap between the uplink reference signal and a subsequent portion of the slot.

10. The method of claim 5, further comprising scheduling, within the slot or in a next slot and based on measuring the cross-link interference, resources for downlink communications to the UE.

11. The method of claim 5, further comprising transmitting, in at least one of a next slot or one or more symbols of the slot following the portion of the slot, and based on the uplink reference signal, downlink data communications to the UE.

12. The method of claim 5, further comprising selecting the slot pattern for communicating with the UE based at least in part on at least one of feedback received from one or more base stations regarding other cross-link interference or downlink-to-uplink traffic ratio.

13. The method of claim 1, wherein determining the portion of the slot comprises determining the portion as a last symbol of the slot scheduled for downlink shared channel communications.

14. An apparatus for measuring cross-link interference in wireless communications at a first base station, comprising:
    a transceiver for communicating one or more wireless signals via at least a transmitter and one or more antennas;
    a memory configured to store instructions; and
    one or more processors communicatively coupled with the transceiver and the memory, wherein the one or more processors are configured to:
        transmit, to a user equipment (UE), a configuring including an indication of a slot pattern for communicating over multiple slots over a period of time, wherein the slot pattern specifies each of the multiple slots as being one of a downlink slot, an uplink slot, or a downlink-centric slot with an uplink measurement, and wherein the slot pattern identifies at least a first slot of the multiple slots as a downlink slot, at least a second slot of the multiple slots as an uplink slot, and at least a third slot of the multiple slots as a downlink-centric slot with an uplink measurement;
        determine, based at least in part on determining that the configuration indicates a slot in the multiple slots as being a downlink-centric slot with an uplink measurement, a portion of the current slot that includes a downlink reference signal transmitted by a second base station and an uplink reference signal transmitted by the UE, wherein the uplink reference signal and the downlink reference signal at least partially overlap within the portion of the slot;
        receive, in the portion of the slot, the downlink reference signal from the second base station;

receive, in the portion of the slot, the uplink reference signal from the UE; and measure, based on determining the portion of the slot, cross-link interference between the downlink reference signal and the uplink reference signal.

15. The apparatus of claim 14, wherein the one or more processors are further configured to receive, from the second base station, an indication that the second base station transmits the downlink reference signal in the portion of the slot.

16. The apparatus of claim 14, wherein the one or more processors are further configured to receive, in one or more symbols of the slot and based at least in part on receiving the downlink reference signal in the slot, downlink communications from the second base station.

17. The apparatus of claim 16, wherein the one or more processors are further configured to determine one or more guard symbols before and adjacent to the portion of the slot that includes the downlink reference signal.

18. The apparatus of claim 14, wherein the one or more processors are further configured to schedule the UE to transmit the uplink reference signal in the portion of the slot.

19. The apparatus of claim 18, wherein the one or more processors are further configured to schedule one or more gaps in symbols adjacent to the portion of the slot.

20. The apparatus of claim 18, wherein the one or more processors are further configured to schedule, within the slot or in a next slot and based on measuring the cross-link interference, resources for uplink communications from the UE.

21. The apparatus of claim 18, wherein the one or more processors are further configured to receive, in at least one of a next slot or one or more symbols of the slot following the portion of the slot, and based on the uplink reference signal, uplink data communications from the UE.

22. The apparatus of claim 18, wherein the one or more processors are further configured to schedule the UE to transmit the uplink reference signal in an advanced position of the portion of the slot to cause a gap between the uplink reference signal and a subsequent portion of the slot.

23. The apparatus of claim 18, wherein the one or more processors are further configured to schedule, within the slot or in a next slot and based on measuring the cross-link interference, resources for downlink communications to the UE.

24. The apparatus of claim 18, wherein the one or more processors are further configured to transmit, in at least one of a next slot or one or more symbols of the slot following the portion of the slot, and based on the uplink reference signal, downlink data communications to the UE.

25. The apparatus of claim 18, wherein the one or more processors are further configured to select the slot pattern for communicating with the UE based at least in part on at least one of feedback received from one or more base stations regarding other cross-link interference or downlink-to-uplink traffic ratio.

26. The apparatus of claim 14, wherein the one or more processors are configured to determine the portion of the slot as a last symbol of the slot scheduled for downlink shared channel communications.

27. An apparatus for measuring cross-link interference in wireless communications at a first base station, comprising:
means for transmitting, to a user equipment (UE), a configuration including an indication of a slot pattern for communicating over multiple slots over a period of time, wherein the slot pattern specifies each of the multiple slots as being one of a downlink slot, an uplink slot, or a downlink-centric slot with an uplink measurement, and wherein the slot pattern identifies at least a first slot of the multiple slots as a downlink slot, at least a second slot of the multiple slots as an uplink slot, and at least a third slot of the multiple slots as a downlink-centric slot with an uplink measurement;

means for determining, based at least in part on determining that the configuration indicates a slot in the multiple slots as being a downlink-centric slot with an uplink measurement, a portion of the slot that includes a downlink reference signal transmitted by a second base station and an uplink reference signal transmitted by the UE, wherein the uplink reference signal and the downlink reference signal at least partially overlap within the portion of the slot;

means for receiving, in the portion of the slot, the downlink reference signal from the second base station;

means for receiving, in the portion of the slot, the uplink reference signal from the UE; and means for measuring, based on determining the portion of the slot, cross-link interference between the downlink reference signal and the uplink reference signal.

28. The apparatus of claim 27, further comprising means for receiving, from the second base station, an indication that the second base station transmits the downlink reference signal in the portion of the slot.

29. A non-transitory computer-readable medium, comprising code executable by one or more processors for measuring cross-link interference in wireless communications, the code comprising:
code for transmitting, by a first base station to a user equipment (UE), a configuring including an indication of a slot pattern for communicating over multiple slots over a period of time, wherein the slot pattern specifies each of the multiple slots as being one of a downlink slot, an uplink slot, or a downlink-centric slot with an uplink measurement, and wherein the slot pattern identifies at least a first slot of the multiple slots as a downlink slot, at least a second slot of the multiple slots as an uplink slot, and at least a third slot of the multiple slots as a downlink-centric slot with an uplink measurement;

code for determining, by the first base station and based at least in part on determining that the configuration indicates a slot in the multiple slots as being a downlink-centric slot with an uplink measurement, a portion of the slot that includes a downlink reference signal transmitted by a second base station and an uplink reference signal transmitted by the UE, wherein the uplink reference signal and the downlink reference signal at least partially overlap within the portion of the slot;

code for receiving, by the first base station and in the portion of the slot, the downlink reference signal from the second base station;

code for receiving, by the first base station and in the portion of the slot, the uplink reference signal from the UE; and code for measuring, based on determining the portion of the slot, cross-link interference between the downlink reference signal and the uplink reference signal.

30. The non-transitory computer-readable medium of claim 29, further comprising code for receiving, from the second base station, an indication that the second base station transmits the downlink reference signal in the portion of the slot.

* * * * *